United States Patent
Xiao et al.

(10) Patent No.: US 10,422,289 B2
(45) Date of Patent: Sep. 24, 2019

(54) METHOD AND SYSTEM FOR A BOOSTED ENGINE

(71) Applicant: Ford Global Technologies, LLC, Dearborn, MI (US)

(72) Inventors: Baitao Xiao, Canton, MI (US); David Bell, Plymouth, MI (US); Tyler Kelly, Plymouth, MI (US); Timothy Stolzenfeld, Livonia, MI (US); Julia Helen Buckland, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 15/693,125

(22) Filed: Aug. 31, 2017

(65) Prior Publication Data
US 2019/0063348 A1    Feb. 28, 2019

(51) Int. Cl.
*F02D 41/00* (2006.01)
*F02B 37/16* (2006.01)
(Continued)

(52) U.S. Cl.
CPC .......... *F02D 41/0007* (2013.01); *F02B 37/16* (2013.01); *F02B 37/186* (2013.01);
(Continued)

(58) Field of Classification Search
CPC ...... F02D 41/0007; F02D 11/02; F02D 41/10; F02D 41/26; F02B 37/16; F02B 37/186;
(Continued)

(56) References Cited

U.S. PATENT DOCUMENTS 5,829,254 A    11/1998   Hayashi et al.
6,705,084 B2    3/2004   Allen et al.
(Continued)

FOREIGN PATENT DOCUMENTS

EP    1927739 A1    6/2008
FR    2837527 A1    9/2003
WO   2005024202 A1    3/2005

OTHER PUBLICATIONS

Xiao, Baitao, "Method and System for Boost Pressure Control," U.S. Appl. No. 15/160,842, filed May 20, 2016, 49 pages.
(Continued)

*Primary Examiner* — Hai H Huynh
*Assistant Examiner* — Gonzalo Laguarda
(74) *Attorney, Agent, or Firm* — Greg Brown; McCoy Russell LLP

(57) ABSTRACT

Methods and systems are provided for coordinated control of a compound boosting system, including a first compressor staged upstream of a second compressor in an engine intake. In one example, a method may include operating the second, downstream compressor in steady-state to achieve an overall pressure ratio across the compound boosting system while operating the first, upstream compressor transiently, based on an airflow shortfall at the downstream compressor. A timing and amount of electric assistance provided to transiently operate the first, upstream compressor may be adjusted dynamically as the pressure ratio across the second compressor changes.

15 Claims, 8 Drawing Sheets

(51) Int. Cl.
*F02B 37/18* (2006.01)
*F02B 39/10* (2006.01)
*F02B 39/16* (2006.01)
*F02D 11/02* (2006.01)
*F02D 41/10* (2006.01)
*F02D 41/26* (2006.01)
*F02D 11/10* (2006.01)
*F02B 37/04* (2006.01)

(52) U.S. Cl.
CPC .............. *F02B 39/10* (2013.01); *F02B 39/16* (2013.01); *F02D 11/02* (2013.01); *F02D 11/105* (2013.01); *F02D 41/10* (2013.01); *F02D 41/26* (2013.01); *F02B 37/04* (2013.01); *F02D 2200/0402* (2013.01); *F02D 2200/602* (2013.01); *Y02T 10/144* (2013.01)

(58) Field of Classification Search
CPC .......... F02B 37/04; F02B 39/10; F02B 39/16; F02B 39/12; F02B 33/40; Y02T 10/144
USPC .................. 123/562, 564, 565, 590, 592
See application file for complete search history.

(56) References Cited

U.S. PATENT DOCUMENTS

| | | | |
|---|---|---|---|
| 6,735,945 B1 | 5/2004 | Hall et al. | |
| 7,260,933 B2 | 8/2007 | Barba et al. | |
| 7,779,634 B2 | 8/2010 | Barthelet et al. | |
| 7,958,730 B2 | 6/2011 | Stewart | |
| 8,176,735 B2 | 5/2012 | Komatsu | |
| 8,371,121 B2 | 2/2013 | Godeke et al. | |
| 2004/0194465 A1* | 10/2004 | Bolz | F02B 37/04 60/612 |
| 2009/0255517 A1 | 10/2009 | Ishikawa et al. | |
| 2010/0263375 A1* | 10/2010 | Grieve | F02B 29/0412 60/612 |
| 2014/0127002 A1 | 5/2014 | Joergl et al. | |
| 2014/0208745 A1* | 7/2014 | Suhocki | F02B 37/04 60/611 |
| 2015/0066272 A1* | 3/2015 | Benjey | B60K 6/485 701/22 |

OTHER PUBLICATIONS

Xiao, Baitao, "Method and System for Boost Pressure Control," U.S. Appl. No. 15/160,880, filed May 20, 2016, 51 pages.
Xiao, Baitao, "Method and System for a Boosted Engine," U.S. Appl. No. 15/693,038, filed Aug. 31, 2017, 71 pages.

* cited by examiner

METHOD AND SYSTEM FOR A BOOSTED ENGINE

FIELD

The present description relates generally to methods and systems for a boosted engine system having staged charge boosting devices.

BACKGROUND/SUMMARY

Engines may be configured with boosting devices, such as turbochargers or superchargers, to increase airflow into a combustion chamber. Turbochargers and superchargers compress intake air entering the engine using an intake compressor. While a turbocharger includes a compressor that is mechanically driven by an exhaust turbine, an electric supercharger includes a compressor that is electrically driven by a motor. In some engine systems, one or more intake charging devices may be staged in series or parallel in what may be referred to as a compound boosting configuration. For example, a fast, auxiliary boosting device (e.g., the electric supercharger) may be utilized to increase the transient performance of a slower, primary boosting device (e.g., the turbocharger). In such a configuration, the turbocharger may be upsized to increase peak power and torque performance of the engine, which enables more aggressively downsized engines.

Various approaches may be used to provide boost control in a compound boosting system. One example approach for compound boosting system control using pressure ratios is shown by Petrovic et al. in EP 1,927,739 A1. The pressure ratio may represent the boosting capability of a boosting device of the compound boosting system. In the approach of Petrovic, a method for coordinating two turbochargers based on desired partial pressure ratios is disclosed. Specifically, the desired partial pressure ratios for each turbocharger are determined based on calibrated look-up tables using engine speed and engine torque as inputs. The desired partial pressure ratios are then achieved through at least one of adjusting a turbocharger wastegate opening, adjusting turbine vane geometry (e.g., if a variable geometry turbine is included), and adjusting openings of turbine and/or compressor bypasses.

However, the inventors herein have recognized potential issues with such systems. As one example, it is a static approach that uses predefined calibrations to determine the desired partial pressure ratios, which may be independent of one another (e.g., the desired partial pressure ratio of one compression device does not influence the desired partial pressure ratio of the other compression device). If the approach of Petrovic were applied to a compound boosting system including an electric supercharger staged alongside a turbocharger, the approach may cause the supercharger to be run for a longer than required duration, resulting in a drop in fuel economy. As another example, the pressure ratios commanded to each compression device may be calibrated conservatively in order to minimize boost pressure overshoot. However, this can result in a slower boost response. Further still, if any of the compression devices are configured with electric assist (such as electric assist from an electric motor/generator coupled to a supercharger compressor, a turbocharger compressor, or a turbocharger shaft), opening of an exhaust waste-gate responsive to the boost pressure overshoot may represent a lost opportunity for energy recuperation at the electric motor/generator.

In one example, the issues described above may be addressed by a method comprising: adjusting operation of a first intake compression device based on a target boost pressure; commanding positive torque from an electric motor to a second intake compression device when a difference between a throttle inlet pressure and the target boost pressure is higher than a threshold; and commanding negative torque from the electric motor to the second intake compression device when the difference is smaller than the threshold. In this way, a target boost pressure can be reached faster while increasing the energy recuperation opportunity of the electric motor.

As one example, a compound boosting system may include an upstream, faster-acting, auxiliary compressor configured with electric assistance (e.g., an electric supercharger compressor) and a downstream, slower-acting, primary compressor (e.g., a turbocharger compressor). Responsive to an operator torque demand, an engine controller may dynamically allocate pressure ratios to each compressor to provide a target boost pressure. In particular, an overall pressure ratio command may be aggressively generated for the turbocharger. The overall pressure ratio command may include corresponding adjustments to an opening of an exhaust waste-gate valve coupled in a waste-gate across the turbocharger turbine. For example, as the torque demand increases, the waste-gate opening may be decreased more aggressively to direct more exhaust flow through the turbine, spinning up the turbine to spin up the turbocharger compressor. However, due to the inherently slower response time of the turbocharger, there may be a temporary shortfall in boost availability, as indicated by a higher than threshold difference between the target boost pressure and a throttle inlet pressure (or the outlet pressure of the turbocharger compressor). The shortfall may be addressed by spinning up the electric supercharger using positive torque from an electric motor. When the shortfall decreases, such as when there is a lower than threshold difference between the target boost pressure and the throttle inlet pressure, but before the throttle inlet pressure reaches the target boost pressure, the electric assistance may be disabled and the motor may be used as a generator to absorb torque from the compressor. By adjusting a timing of when the electric assistance is disabled, the throttle inlet pressure may be coasted towards the target boost pressure without incurring any overshoots, while at the same time, energy can be recuperated at the electric motor. It will be appreciated that while the example is described with reference to an electric supercharger, it is not meant to be limiting, and the same approach may be used for an alternate compression device configured with electric assistance, such as an electric turbocharger.

In this way, by more aggressively calibrating a pressure ratio commanded to each of a higher frequency auxiliary compressor configured with electric assistance as well as a lower frequency primary compressor, a target boost pressure may be achieved more efficiently. By commanding a positive speed output to an electric motor providing the electric assistance when the actual boost pressure is further from the target boost pressure, a transient boost response may be improved. The technical effect of commanding a negative speed output to the electric motor when the actual boost pressure is closer to, but not yet at, the target boost pressure, is to reduce boost overshoot, while maximizing the energy recuperation ability of the electric motor. Overall, boost pressure can be provided rapidly and more efficiently.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
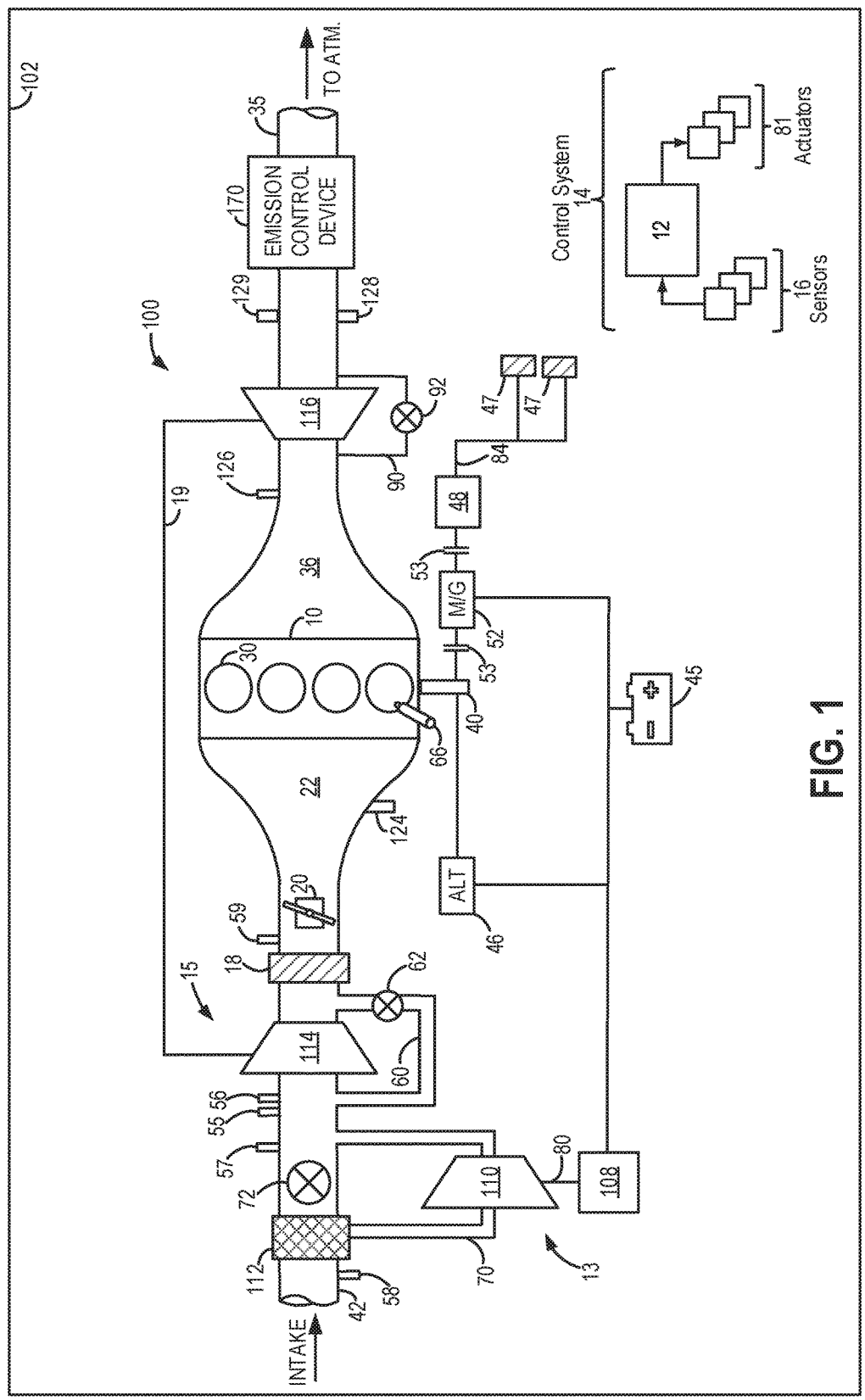
FIG. 1 shows an example embodiment of a compound boosted engine system having multiple staged intake compression devices.
Figure 3:
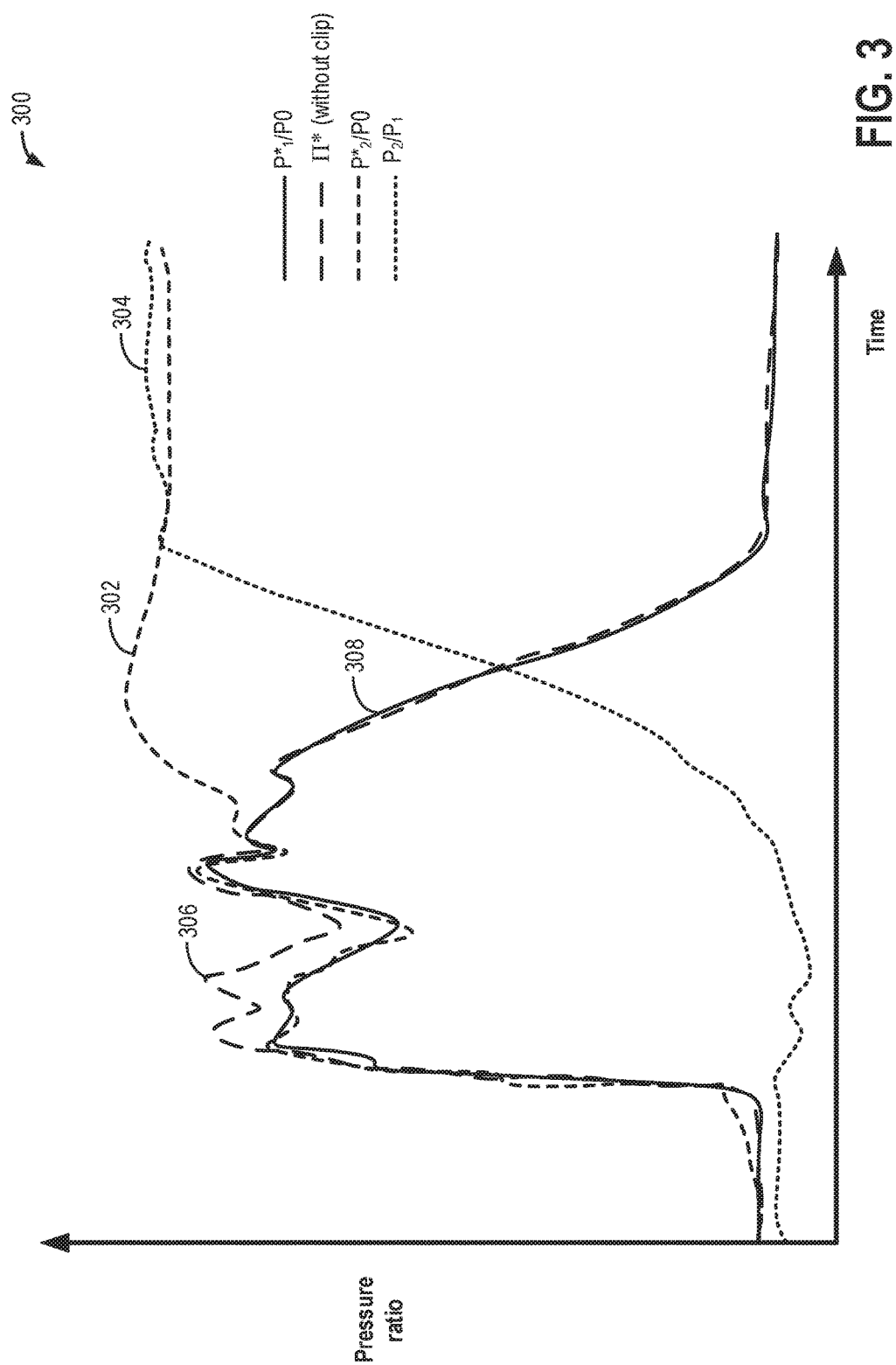
FIG. 3 depicts an example dynamic pressure ratio allocation between an electric supercharger and a turbocharger control during a vehicle acceleration event.
Figure 4:
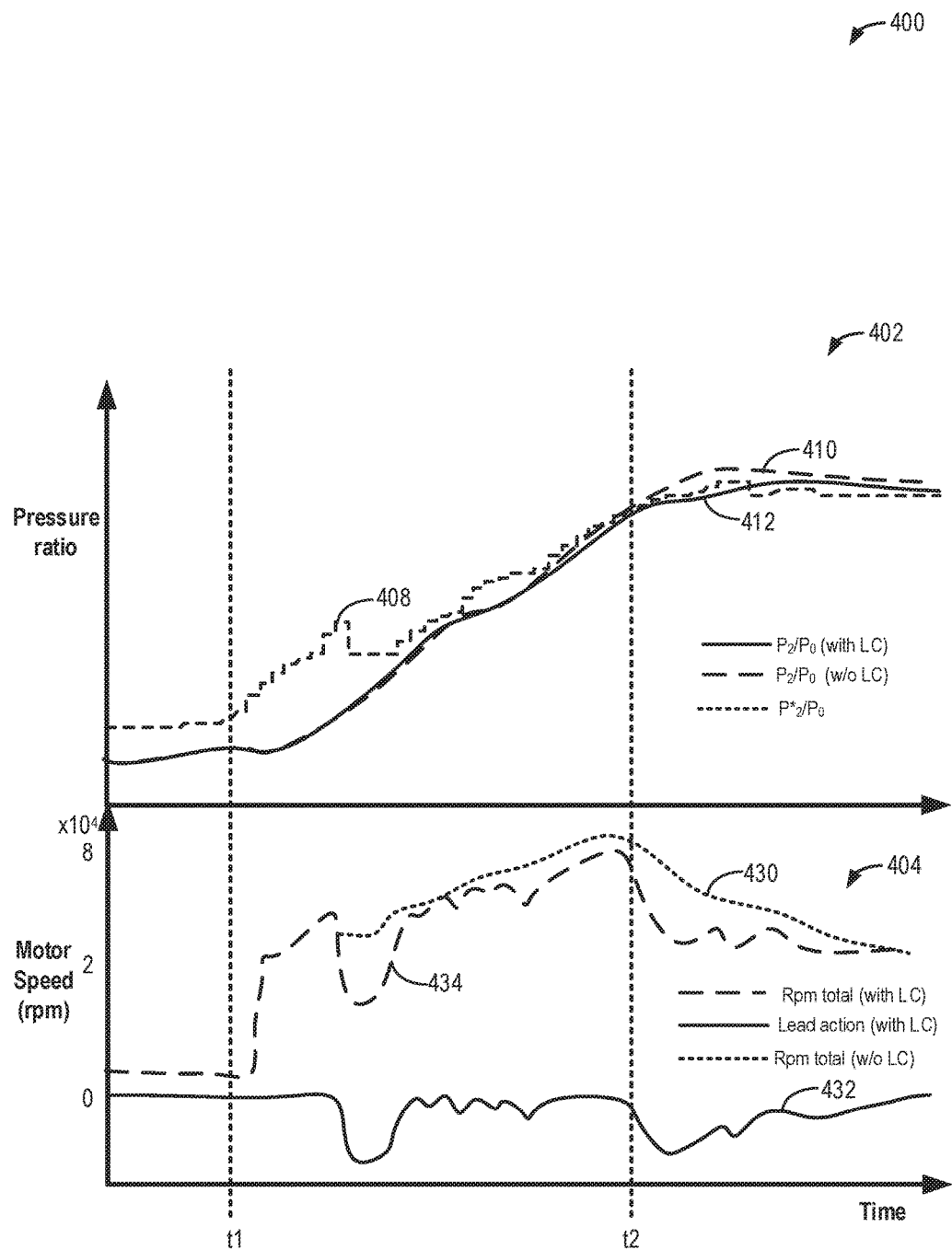
FIG. 4 depicts an example system response using a lead compensator.
Figure 7:
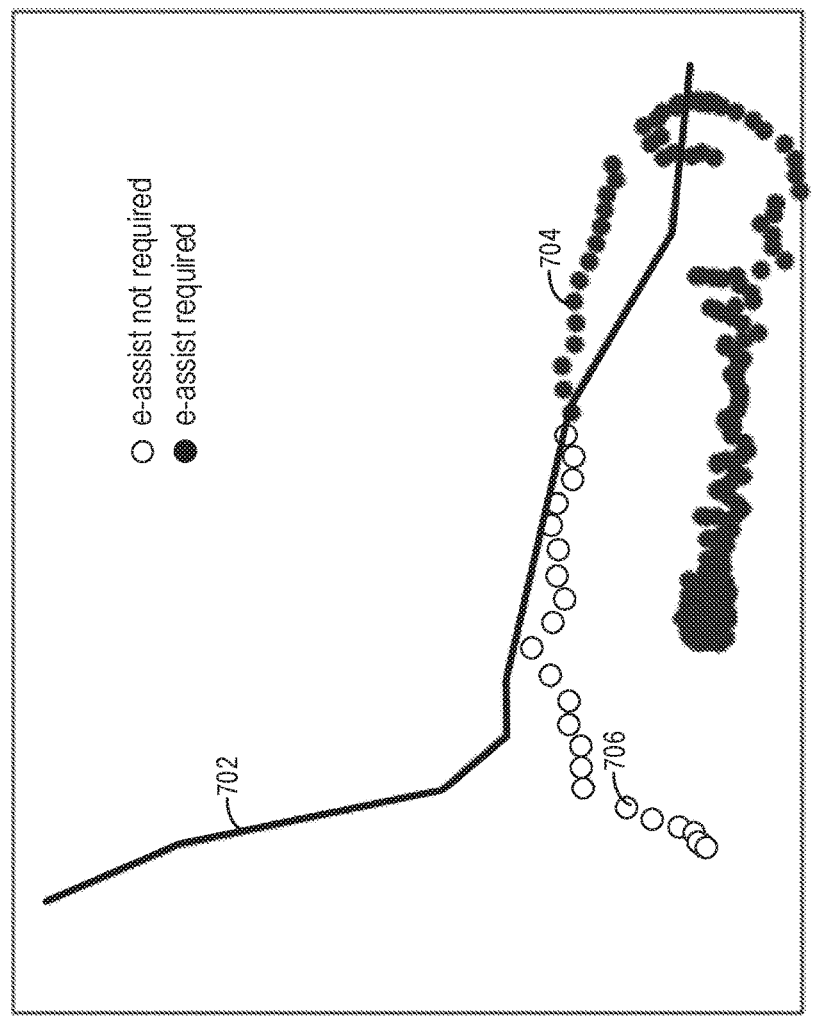
FIG. 7 shows a map with example acceleration trajectories according to the present disclosure.
Figure 8:
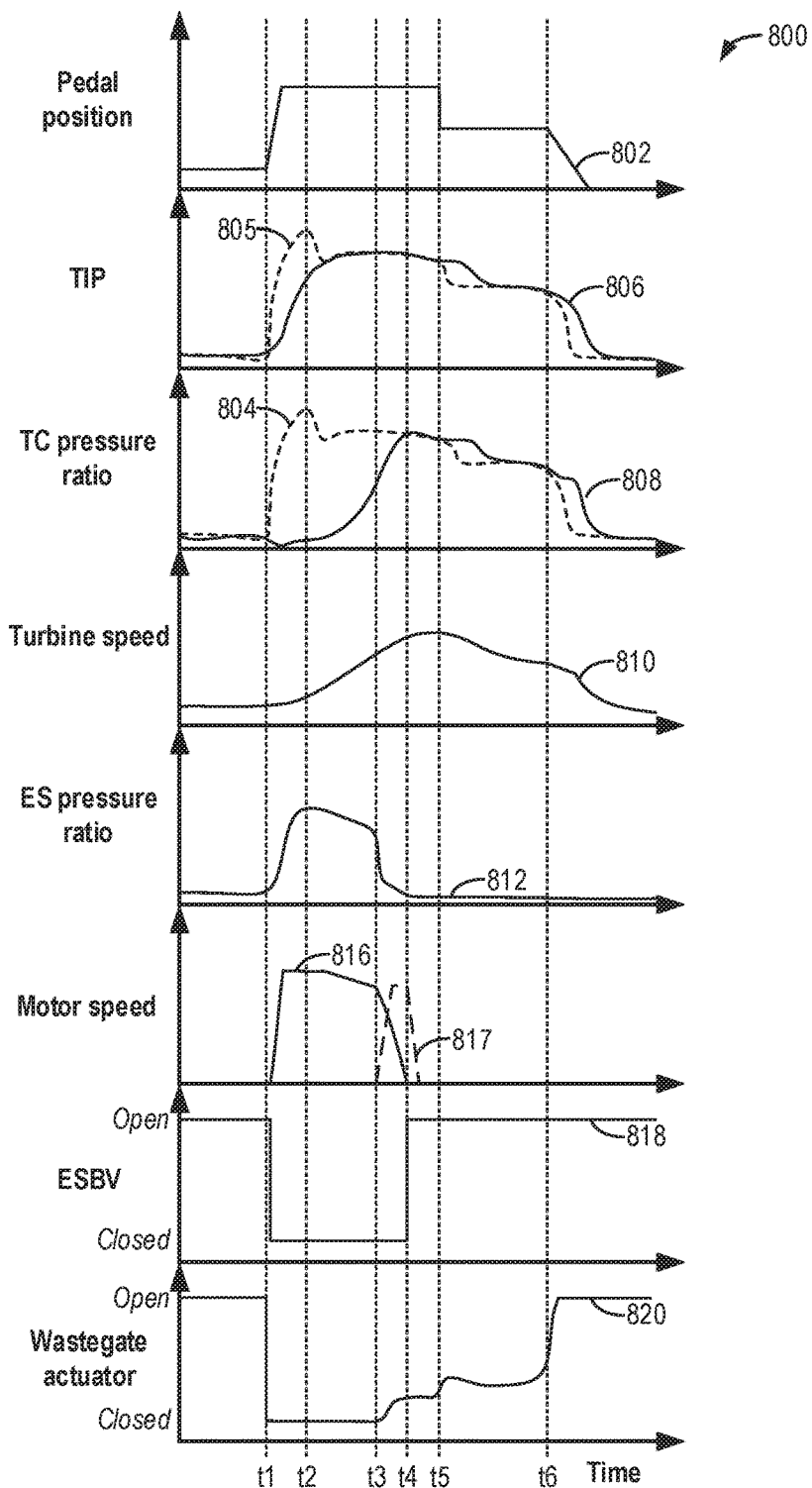
FIG. 8 depicts a prophetic example of turbocharger and electric supercharger pressure ratio coordination during vehicle operation.

The following description relates to systems and methods for boost control in an engine system having staged boosting devices, wherein at least one of the boosting devices is configured with electric assist. One non-limiting example of such a boosted engine system is shown in FIG. 1, wherein a turbocharger is staged downstream of an electric supercharger. Boost control in the compound boosting system may be achieved by dynamically allocating distinct pressure ratio commands to each compression device, and by further using lead compensation to reduce pressure overshoots. An engine controller may be configured to perform a control routine, such as the example routine of FIG. 2, via the control architecture of FIG. 5, to allocate a pressure ratio to the slower-acting compression device based on the torque demand, while allocating a pressure ratio to the faster-acting compression device (with electric assist) based on an airflow shortfall. In addition, the controller may use a lead compensator to determine when to increase and decrease electric assistance from an electric motor so as to reduce pressure overshoots. One example approach that may be applied in the engine system of FIG. 1 is shown at the example routine of FIG. 6. As a result of the dynamic pressure ratio allocation, a target boost pressure may be achieved in a shorter amount of time and with reduced reliance on electric assistance, as shown at FIG. 3. As a result of the lead compensation, boost pressure overshooting may be reduced while maximizing energy recuperation opportunities at an electric motor, as shown at FIG. 4. By relying on these approaches, an acceleration trajectory, such as shown in FIG. 7, can be improved. A prophetic example of coordinating turbocharger and electric supercharger operation based on pressure ratios during vehicle operation is shown in FIG. 8.

FIG. 1 schematically shows aspects of an example engine system 100, including an engine 10 coupled in a vehicle 102. In some examples, vehicle 102 may be a hybrid vehicle with multiple sources of torque available to one or more vehicle wheels 47. In other examples, vehicle 102 is a conventional vehicle with only an engine. In the example shown, a powertrain of vehicle 102 includes engine 10 and an electric machine 52. Electric machine 52 may be a motor or a motor/generator. Engine 10 and electric machine 52 are connected to vehicle wheels 47 via a transmission 48 when one or more clutches 53 are engaged. In the depicted example, a (first) clutch 53 is provided between engine 10 and electric machine 52, and a (second) clutch 53 is provided between electric machine 52 and transmission 48. A controller 12 may send a signal to an actuator of each clutch 53 to engage or disengage the clutch, thereby connecting or disconnecting engine 10 from electric machine 52 and the components connected thereto and/or connecting or disconnecting electric machine 52 from transmission 48 and the components connected thereto. For example, torque from engine 10 may be transferred to vehicle wheels 47 via a crankshaft 40, transmission 48, and a powertrain shaft 84 when clutches 53 are engaged. Transmission 48 may be a gearbox, a planetary gear system, or another type of transmission. Transmission 48 may be a fixed ratio transmission that includes a plurality of gear ratios to allow engine 10 to rotate at a different speed than wheels 47. By changing a torque transfer capacity of first clutch 53 (e.g., an amount of clutch slippage), an amount of engine torque relayed to the wheels via powertrain shaft 84 may be modulated.

The powertrain may be configured in various manners, including as a parallel, a series, or a series-parallel hybrid vehicle. In electric vehicle embodiments, a system battery 45 may be a traction battery that delivers electrical power to electric machine 52 to provide torque to vehicle wheels 47. In some embodiments, electric machine 52 may also be operated as a generator to provide electrical power to charge system battery 45, for example, during a braking operation. It will be appreciated that in other embodiments, including non-electric vehicle embodiments, system battery 45 may be a typical starting, lighting, ignition (SLI) battery coupled to an alternator 46.

Alternator 46 may be configured to charge system battery 45 using engine torque drawn from the crankshaft during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems, as described further below, based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

In the depicted embodiment, engine 10 is a compound boosted engine configured with multiple, staged boosting devices. Specifically, engine 10 includes a first boosting device staged upstream of a second boosting device. Herein, the first boosting device is an auxiliary boosting device and the second boosting device is a primary boosting device, although other configurations may be possible. The depicted configuration results in a first compressor 110 (of the first boosting device) being positioned in an engine intake passage 42 upstream of a second compressor 114 (of the second boosting device). At least one of the boosting devices may be configured with electric assistance from an electric motor. In the present example, the first boosting device is an electric supercharger 13 configured to operate with electric assistance from an electric motor, while the second boosting device is a turbocharger 15. However, other combinations and configurations of boosting devices may be possible without departing from the scope of this disclosure. For example, in alternate embodiments, turbocharger 15 may be an electric turbocharger having an electric motor coupled to the compressor, turbine, or turbocharger shaft while the supercharger is configured as an electrical or mechanical supercharger. In still other examples, both the first and second boosting device may be electric superchargers or electric turbochargers.

In the depicted example, electric supercharger 13 includes first compressor 110, which is driven by an electric motor 108. Specifically, a fan of first compressor 110 may be driven by power received from electric motor 108 along a supercharger compressor shaft 80. In some examples, first compressor 110 of supercharger 13 may additionally be driven by the engine crankshaft via a clutch and gear mechanism. Electric motor 108 may be powered by an on-board energy storage device, such as system battery 45. Electric motor 108 may be additionally or alternatively powered by alternator 46. An amount of electrical power delivered to electric motor 108 may be varied in order to adjust a duty cycle of the supercharger. In one example, the amount of electric power delivered to electric motor 108 may be increased to increase the speed of first compressor 110, with a corresponding increase in the electrical load applied on the alternator and a decrease in alternator current. As a result of the electrical assistance, supercharger 13 may be rapidly spun up, providing for a fast-acting or high frequency boost actuation.

During selected conditions, air may enter first compressor 110 when the opening of an electric supercharger bypass valve (ESBV) 72 is decreased, thereby directing incoming air from an air box 112 through a first compressor bypass passage 70 and first compressor 110, where it is pressurized for delivery to the second compressor 114. Fresh air received at an inlet of second compressor 114 is then compressed and introduced into engine 10. As the opening of ESBV 72 increases, an amount of air entering second compressor 114 without having passed through first compressor bypass passage 70 and first compressor 110 increases. During conditions when ESBV 72 is fully opened, compressed air may be delivered to engine 10 via second compressor 114 of turbocharger 15 only. By spinning up the electric supercharger via the electric motor, a burst of boost pressure may be rapidly provided to the engine.

Electric motor 108 may be configured as a motor-generator. Thus, during conditions when electric assistance is required for boost build-up, the electric motor may provide positive torque to drive either the centrifugal compressor of the supercharger (or the turbocharger shaft) to improve the transient boost pressure delivery. However, the electric motor is also capable of energy recuperation by "braking" the motor shaft. Therein, negative torque may be applied to the compressor (or shaft), reducing the compressor speed and concurrently charging the system battery (such as battery 45) coupled to the motor. As elaborated with reference to FIG. 2, an engine controller may control a timing and amount of positive torque and negative torque applied from the electric motor to the supercharger so as to regulate a Throttle Inlet Pressure (TIP)/boost pressure.

Turbocharger 15 includes second compressor 114, which is driven by a turbine 116. Second compressor 114 is shown as a turbocharger compressor mechanically coupled to turbine 116 via a shaft 19, the turbine 116 driven by expanding engine exhaust. In one embodiment, the turbocharger may be a twin scroll device. In another embodiment, the turbocharger may be a variable geometry turbocharger (VGT), wherein turbine geometry is actively varied as a function of engine operating conditions.

Fresh air is introduced along intake passage 42 into engine 10 via air box 112 and flows to second compressor 114. During selected conditions, as elaborated below, air compressed by turbocharger 15 may be recirculated from an outlet to an inlet of second compressor 114 through a second compressor bypass passage 60 by adjusting an opening of a compressor recirculation valve (CRV) 62. CRV 62 may be a continuously variable valve, and increasing the opening of the CRV 62 may include actuating (or energizing) a solenoid of the valve.

One or both of CRV 62 and ESBV 72 may be continuously variable valves wherein a position of the valve is continuously variable from a fully closed position to a fully open position. Alternatively, CRV 62 may be a continuously variable valve while ESBV 72 is an on-off valve. In some embodiments, CRV 62 may be partially open during boosted engine operation to provide a surge margin. Herein, the partially open position may be a default valve position. Then, in response to an indication of surge, the opening of CRV 62 may be increased. For example, CRV 62 may be adjusted from the default, partially open position toward a fully open position, with a degree of opening based on the indication of surge (e.g., the compressor ratio, the compressor flow rate, a pressure differential across the compressor, etc.). In alternate examples, CRV 62 may be held closed during boosted engine operation (e.g., peak performance conditions) to decrease boost response time and increase peak performance.

Second compressor 114 is coupled to a throttle valve 20 through a charge-air cooler (CAC) 18 (also referred to as an intercooler herein). Air flows from second compressor 114 through CAC 18 and throttle valve 20 to an intake manifold 22. CAC 18 may be an air-to-air or water-to-air heat exchanger, for example. Intake manifold pressure (e.g., a pressure of the air charge within the intake manifold) may be determined using a manifold absolute pressure (MAP) sensor 124.

Intake manifold 22 is coupled to a series of combustion chambers 30 through a series of intake valves (not shown). The combustion chambers are further coupled to an exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted for the desired combustion and emissions-control performance. For example, the cam timing may be adjusted via a variable cam timing system to move the intake and exhaust cams to a position that provides the optimal volumetric efficiency for the given operating conditions.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the depicted example, fuel is provided to each combustion chamber 30 via direct injection by a fuel injector 66 (while only one fuel injector is shown in FIG. 1, each combustion chamber includes a fuel injector coupled thereto). Fuel may be delivered to fuel injector 66 by a fuel system (not shown) including a fuel tank, a fuel pump, and a fuel rail. In the combustion chambers, combustion may be initiated via spark ignition and/or compression ignition.

As shown in FIG. 1, exhaust from exhaust manifold 36 is directed to turbine 116 to drive the turbine. When reduced turbine torque is desired, a portion of exhaust may be directed instead through a wastegate 90, bypassing the turbine. A wastegate actuator 92 (e.g., wastegate valve) may be actuated open to relieve at least some exhaust pressure from upstream of turbine 116 to a location downstream of turbine 116 via wastegate 90. By reducing exhaust pressure upstream of turbine 116, turbine speed may be reduced.

The combined flow from turbine 116 and wastegate 90 flows through an emission control device 170. In general, emission control device 170 may include one or more exhaust after-treatment components configured to reduce an amount of one or more substances in the exhaust flow. For example, one exhaust after-treatment component may be configured to trap $NO_x$ from the exhaust flow when the exhaust flow is lean and to reduce the trapped $NO_x$ when the exhaust flow is rich. In other examples, an exhaust after-treatment component may be configured to disproportionate $NO_x$ or to selectively reduce $NO_x$ with the aid of a reducing agent. In still other examples, emission control device 170 includes a three-way catalyst configured to oxidize residual hydrocarbons and carbon monoxide while reducing $NO_x$ in the exhaust flow. Different exhaust after-treatment catalysts having any such functionality may be arranged in wash coats or elsewhere in emission control device 170, either separately or together. In some embodiments, the emission control device 170 may further include a regeneratable soot filter configured to trap and oxidize soot particles in the exhaust flow.

All or part of the treated exhaust from emission control device 170 may be released into the atmosphere via an exhaust conduit 35. Depending on operating conditions, however, some exhaust may be diverted instead to intake passage 42 via an exhaust gas recirculation (EGR) passage (not shown), including an EGR cooler and an EGR valve. EGR may be recirculated to the inlet of first compressor 110, the inlet of second compressor 114, or both.

One or more sensors may be coupled to the inlet of second compressor 114 (as shown) and/or first compressor 110 (not shown). For example, a temperature sensor 55 may be coupled to the inlet of second compressor 114 for estimating a compressor inlet temperature. As another example, a pressure sensor 56 may be coupled to the inlet of second compressor 114 for estimating a pressure of air entering the second compressor. The pressure upstream of second compressor 114 and downstream of first compressor 110, as measured by pressure sensor 56, will be herein referred to as $P_1$. Still other sensors may include, for example, air-fuel ratio sensors, humidity sensors, etc. In other examples, one or more of the second compressor inlet conditions (such as humidity, temperature, etc.) may be inferred based on engine operating conditions. The sensors may estimate a condition of the intake air received at the second compressor inlet from the intake passage as well as the aircharge recirculated from upstream of CAC 18. One or more sensors may also be coupled to intake passage 42 upstream of first compressor 110 for determining a composition and condition of aircharge entering the compressor. These sensors may include, for example, a pressure sensor 58. The pressure upstream of air box 112 (e.g., barometric pressure), as measured by pressure sensor 58, will be herein referred to as $P_0$. In addition, a throttle inlet pressure (TIP) sensor 59 may be coupled downstream of CAC 18 and upstream of throttle valve 20 for estimating a boost pressure delivered to the engine. The pressure downstream of CAC 18 and upstream of throttle valve 20, as measured by TIP sensor 59, will be herein referred to as $P_2$. A total pressure ratio across the compound boosting system is defined as $$\frac{P_2}{P_0},$$

a pressure ratio across first compressor 110 is defined as $$\frac{P_1}{P_0},$$

and a pressure ratio across second compressor 114 is defined as $$\frac{P_2}{P_1}.$$

During an operator tip-in event, when going from engine operation without boost to engine operation with boost responsive to an increase in operator torque demand, turbo lag can occur. This is due to delays in turbine 116 spin-up due to the turbocharger being a slower-acting compression device, and momentary reduction in flow through second compressor 114 when throttle valve 20 opens at the tip-in. The same may also occur when the engine is operating boosted and there is a transient increase in boost demand due to an increase in accelerator pedal application by the vehicle operator. To reduce this turbo lag, during those selected conditions, both supercharger 13 and turbocharger 15 may be enabled. In particular, the faster-acting, electrically actuated compression device, the electric supercharger, may be used to improve the transient boost response. Specifically, responsive to the tip-in, waste-gate actuator 92 may be closed (e.g., fully closed) to increase exhaust flow through turbine 116. While turbine 116 spins-up, boost pressure can be transiently provided by first compressor 110. Enabling supercharger 13 may include drawing energy from system battery 45 to spin electric motor 108 and thereby accelerate first compressor 110. In addition, ESBV 72 may be closed (e.g., fully closed) so as to enable a larger portion of intake air to flow through bypass passage 70 and be compressed by first compressor 110. In addition, CRV 62 may be closed (e.g., fully closed) so as to increase flow through second compressor 114. When the turbine has sufficiently spun up and the turbocharger is capable of providing the requested amount of boost, first compressor 110 may be decelerated by disabling electric motor 108 (e.g., by discontinuing the supply of power to electric motor 108 from battery 45). In addition, ESBV 72 may be opened so as to enable a larger portion of air to bypass first compressor 110. As described further herein, activation (and deactivation) of first compressor 110 may be precisely controlled in order to provide the desired boost pressure while reducing overshooting or undershooting of the desired boost pressure, minimize boost pressure disturbances when first compressor 110 is enabled/disabled, and minimize a duration of operation of first compressor 110, thereby minimizing an amount of electrical power consumed by supercharger 13. The desired amount of boost may be provided by dynamically coordinating turbocharger 15 and supercharger 13 based on the boosting capability of turbocharger 15 (e.g., the pressure ratio across second compressor 114) at a given time and a desired total boost pressure ratio, as described with respect to FIGS. 2-6. Therein, the controller may dynamically adjust a pressure ratio allocation to the supercharger based on a shortfall in airflow incurred at the turbocharger. In addition, the controller may adjust a timing and output of the motor torque supplied by the electric motor to the supercharger so as to reduce pressure overshoot while maximizing energy recuperation.

During an operator tip-out event, when going from engine operation with boost to engine operation without boost (or reduced boost), compressor surge may occur. This is due to a decreased flow through the second compressor 114 when throttle valve 20 closes at the tip-out. The reduced forward flow through the second compressor can cause surge and degrade turbocharger performance. In addition, surge can lead to noise, vibration, and harshness (NVH) issues such as undesirable noise from the engine intake system. To enable the torque demand to be rapidly reduced responsive to the tip-out without incurring compressor surge during a default mode of vehicle operation, at least a portion of the aircharge compressed by second compressor 114 may be recirculated to the compressor inlet. This allows excess boost pressure to be substantially immediately relieved. In particular, CRV 62 may be opened to recirculate (warm) compressed air from the outlet of second compressor 114, upstream of CAC 18, to the inlet of second compressor 114. In some embodiments, the compressor recirculation system may additionally or alternatively include a recirculation passage for recirculating cooled compressed air from downstream of CAC 18 to the inlet of second compressor 114. In addition, wastegate actuator 92 may be moved to a more open (e.g., fully open) position so that more of the exhaust flow travels to the tailpipe while bypassing the turbine, thereby expediting turbine spin-down.

Controller 12 may be included in a control system 14. Controller 12 is shown receiving information from a plurality of sensors 16 (various examples of which are described herein) and sending control signals to a plurality of actuators 81 (various examples of which are described herein). As one example, sensors 16 may include an exhaust gas sensor 126 located upstream of turbine 116, MAP sensor 124, an exhaust temperature sensor 128, an exhaust pressure sensor 129, compressor inlet temperature sensor 55, compressor inlet pressure sensor 56 (e.g., for measuring $P_1$), a mass air flow (MAF) sensor 57, pressure sensor 58 (e.g., for measuring $P_0$), and TIP sensor 59 (e.g., for measuring $P_2$). Other sensors, such as additional pressure, temperature, air/fuel ratio, and composition sensors, may be coupled to various locations in engine system 100. The actuators 81 may include, for example, throttle valve 20, CRV 62, ESBV 72, electric motor 108, wastegate actuator 92, and fuel injector 66. Controller 12 may receive input data from the various sensors, process the input data, and employ the various actuators to adjust engine operation based on the received signals and instructions stored on a memory of the controller. The controller may employ the actuators in response to the processed input data based on instruction or code programmed therein corresponding to one or more routines, such as example control routines described herein with regard to FIG. 2 (and FIG. 6). As an example, responsive to measured pressures indicating a boost pressure deficiency when operating the turbocharger, the controller may actuate the electric motor driving the supercharger compressor and actuate the ESBV closed in order to provide additional boost via the supercharger compressor.

In this way, the components of FIG. 1 enable a vehicle system comprising: an engine having an intake; an accelerator pedal for receiving an operator torque demand; a compound boost system including a first (auxiliary) supercharger compressor driven by an electric motor receiving electrical power from a battery, and a second (primary) turbocharger compressor driven by an exhaust turbine, the second compressor positioned downstream of the first compressor in the engine intake; a bypass, including a bypass valve, coupled across the first compressor; a waste-gate, including a waste-gate actuator, coupled across the exhaust turbine; a first pressure sensor coupled to the intake, upstream of the first compressor, to estimate barometric pressure; a second pressure sensor coupled to the intake, downstream of the first compressor and upstream of the second compressor, for estimating turbocharger inlet pressure; a third pressure sensor coupled to the intake downstream of the second compressor for estimating a throttle inlet pressure; and a controller with computer readable instructions stored on non-transitory memory for: responsive to the operator torque demand, commanding an overall pressure ratio across the compound boost system via an adjustment to the waste-gate actuator; and varying the pressure ratio commanded across the first compressor, via an adjustment to an output of the electric motor, based on an airflow shortfall at the second compressor, the airflow shortfall estimated based on an actual pressure ratio across the second compressor. In one example, commanding the overall pressure ratio may include decreasing the opening of the waste-gate actuator as the operator torque demand increases to increase the actual pressure ratio across the second compressor, and wherein varying the pressure ratio commanded across the first compressor includes operating the electric motor in a motoring mode when the airflow shortfall increases above a threshold, and operating the electric motor in a generating mode when the airflow shortfall decreases below the threshold. In another example, the controller may include further instructions for: closing the ESBV when the airflow shortfall increases above a threshold to increase the pressure ratio across the first compressor; and opening the ESBV when the airflow shortfall decreases below the threshold to decrease the pressure ratio across the first compressor.

The components of FIG. 1 may further enable the controller to command an overall pressure ratio for a first compression device of an engine intake based on the operator torque demand; when an actual pressure ratio of the second compressor is further from the overall pressure ratio, provide positive motor torque to increase the pressure ratio of the first compressor; and when the actual pressure ratio of the second compressor is closer to the overall pressure ratio, provide negative motor torque to decrease the pressure ratio of the first compressor. In the preceding example, commanding the overall pressure ratio may include decreasing the opening of the waste-gate actuator as the operator torque demand increases to increase the actual pressure ratio across the second compressor, wherein providing the positive motor torque includes operating the electric motor in a motoring mode with a motor output based on an airflow shortfall, the airflow shortfall estimated based on a difference between the actual pressure ratio of the second compressor and the overall pressure ratio, and wherein providing the negative torque includes operating the electric motor in a generating mode with a generator output based on the difference. In a further example, the controller may include further instructions for: closing the ESBV while providing the positive or negative motor torque. The system may further comprise a first pressure sensor coupled to the intake, upstream of the first compressor, to estimate barometric pressure; a second pressure sensor coupled to the intake, downstream of the first compressor and upstream of the second compressor, for estimating turbocharger inlet pressure; and a third pressure sensor coupled to the intake, downstream of the second compressor for estimating a throttle inlet pressure; wherein the controller may include further instructions for: estimating the overall pressure ratio based on an output of the third pressure sensor relative to the output of the first pressure sensor; estimating the actual pressure ratio across the second compressor based on an output of the third pressure sensor relative to the output of the second pressure sensor; and estimating the actual pressure ratio across the first compressor based on an output of the second pressure sensor relative to the output of the first pressure sensor.

Figure 2:
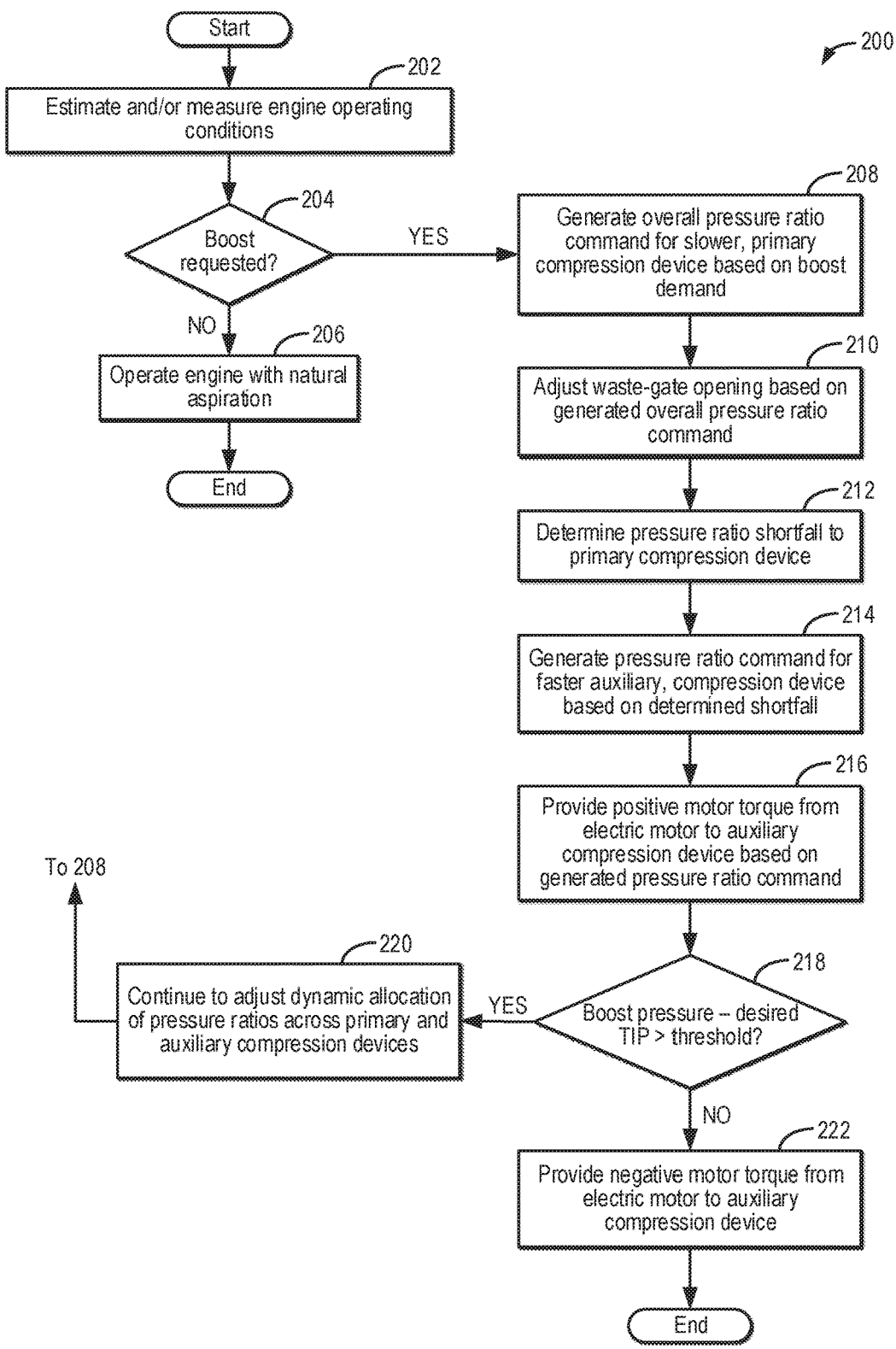
FIG. 2 depicts a high-level flow chart for dynamically allocating pressure ratios between each of multiple intake compression devices in a compound boosted engine system, and adjusting motor torque delivery to the intake compression device configured with electric assist using a lead compensator.

Turning now to FIG. 2, an example method 200 for operating a compound boosted engine system having staged boosting devices is shown. The compound boosted engine system may include at least two, serially arranged intake compression devices, at least one of which includes electric assist. One of the at least two compression devices may be a slower acting (lower frequency) compression device, such as a turbocharger configured as the primary boosting device, while another other of the two compression devices may be a faster acting (higher frequency) compression device, such as an electric supercharger configured as the auxiliary boosting device. Instructions for carrying out method 200 and the rest of the methods included herein may be executed by a controller (e.g., controller 12 of FIG. 1) based on instructions stored on a memory of the controller and in conjunction with signals received from sensors of the engine system, such as the sensors described above with reference to FIG. 1. The controller may employ engine actuators of the engine system, such as an electric supercharger bypass valve (e.g., ESBV 72 of FIG. 1), an electric motor (such as motor 108 of FIG. 1), and a turbocharger wastegate actuator (e.g., wastegate actuator 92 of FIG. 1), to adjust engine operation according to the methods described below.

At 202, method 200 includes estimating and/or measuring engine operating conditions. For example, operating conditions assessed may include engine speed, pedal position, operator torque demand, manifold absolute pressure, manifold air flow, manifold air temperature, ambient conditions (such as ambient temperature, barometric pressure, and humidity), engine coolant temperature, etc. For example, barometric pressure may be measured by a pressure sensor, such as pressure sensor 58 of FIG. 1.

At 204, method 200 includes determining if boost is requested. In one example, boost may be requested at mid-high engine loads. In another example, boost may be requested in response to an operator pedal tip-in or an increase in driver torque demand. If boost is not requested, such as when the engine load is low or the driver torque demand is low, method 200 proceeds to 206 and includes operating the engine with natural aspiration (e.g., manifold vacuum). Operating the engine with natural aspiration may include not activating the staged boosting devices. For example, an electric motor for driving the electric supercharger (e.g., electric motor 108) may not be powered, and the turbocharger waste-gate actuator may be commanded fully open in order to direct a portion of exhaust through the waste-gate while bypassing a turbine of the turbocharger (e.g., turbine 116 of FIG. 1). Following 206, method 200 ends.

If boost is requested at 204, such as responsive to a tip-in event, method 200 proceeds to 208 and includes generating an overall pressure ratio command for the slower, primary compression device based on the operator torque/boost demand. Herein the overall pressure ratio is a steady-state desired pressure ratio that is commanded to, and achieved by, the primary compression device gradually. The overall pressure ratio commanded may be defined as $$\frac{P_2^*}{P_0},$$

where $P_2^*$ represents a desired throttle inlet pressure or a desired pressure at the outlet of the compound boosting system. In one example, this is the pressure at the outlet of the slower-acting primary compression device, such as the outlet pressure of a turbocharger compressor. $P_0$ represents an inlet pressure of the compound boosting system, or a barometric pressure. In one example, this is the pressure at the inlet of the faster-acting auxiliary compression device, such as the inlet pressure of an electric supercharger compressor. In a configuration where the auxiliary compression device is staged upstream of the primary compression device, the actual outlet pressure of the primary compression device, $P_2$ (e.g., as measured by a TIP sensor), may be described as:

$$P_2 = P_0 \times \frac{P_1}{P_0} \times \frac{P_2}{P_1} \qquad (1)$$

where $P_1$ is an outlet pressure of the auxiliary compression device, which is also an inlet pressure of the primary compression device. $P_2$ also corresponds to a total boost pressure achieved across the staged boosting devices. As may be discerned from the above equation, $$\frac{P_1}{P_0}$$

is a pressure ratio across the auxiliary compression device and $$\frac{P_2}{P_1}$$

is a pressure ratio across the primary compression device. In other words, the overall pressure ratio across the system is the product of the pressure ratios across each compressor in series. The pressure ratio represents the capability of the boosting device (e.g. electric supercharger, turbocharger or the compound boosting system). However, the throttle inlet pressure cannot separate the boost contribution from each device. Thus, by coordinating the pressure ratios commanded to each boosting device together with a steady-state desired pressure ratio $P_2*/P_0$, transient boost response can be improved.

In one example, the controller may generate the overall pressure ratio command by estimating $P_0$ based on an output of a barometric pressure sensor. The controller may further estimate $P_2*$ based on an output of an operator accelerator pedal position sensor. The controller may refer to a look-up table wherein target boost pressure is stored as a function of pedal position, such as increasing target boost pressure with increased depression of the accelerator pedal (increased movement of the pedal position towards a fully depressed position). Alternatively, the controller may use a model or algorithm that uses pedal position as an input and provides target boost pressure as an output. Then, the pressure ratio command may be determined as $P_2*/P_0$.

In one example, the turbocharger may be controlled to deliver the entire requested boost pressure, $P_2*$. Therefore, the overall pressure ratio commanded to the turbocharger compressor may be determined as:

$$\frac{P_2}{P_1} \rightarrow \frac{P_2^*}{P_0} \text{ or } P_2 \times \frac{P_0}{P_1} \rightarrow P_2^*, \text{ when } \lim_{t \to \infty} \frac{P_1}{P_0} = 1 \qquad (2)$$

where t represents time.

At 210, the method includes adjusting a boost pressure actuator of the slower acting primary compression device based on the generated overall pressure ratio command. For example, wherein the primary compression device is a turbocharger, the controller may generate a command for a waste-gate coupled across the exhaust turbine based on the generated overall pressure ratio command. The command for the waste-gate may be indicative of a degree of waste-gate valve opening that is sent to a waste-gate actuator. In one example, as the overall pressure ratio command increases, the degree of opening of the waste-gate commanded may be decreased. For example, at higher than threshold pressure ratio commands, the waste-gate may be fully closed.

In one example, the controller may input the overall pressure ratio command and MAF (as determined from an intake MAF sensor) into a look-up table (or model or algorithm) which outputs a position of the turbocharger waste-gate actuator, the position of the turbocharger waste-gate actuator corresponding to a turbine speed and a corresponding turbocharger compressor speed. In another example, the controller may reference a compressor map to determine a desired turbocharger compressor speed for the commanded overall boost pressure and the given airflow conditions and may further relate the resulting turbocharger compressor speed to a corresponding position of the turbocharger waste-gate actuator. Further, the actual turbocharger pressure ratio, $$\frac{P_2}{P_1},$$

may be used as feed-back for waste-gate control. For example, as the actual turbocharger pressure ratio increases, the turbocharger waste-gate actuator may be adjusted to a more open position. Additionally or alternatively, if the turbocharger is within a threshold range of surge, the openings of one or both of the CRV and the waste-gate actuator may be increased.

It will be appreciated that in further examples, the commanded overall pressure ratio may be adjusted (e.g., limited) to account for any mechanical constraints of the boosted engine system, such as a temperature, pressure, or speed constraint of the primary compression device, above which (temperature, pressure, or speed) the performance of the primary compression device may be adversely affected, such as due to hardware issues. In one example, if the commanded overall pressure ratio based only on the operator torque demand is predicted to result in a compressor inlet or outlet temperature (of the primary compression device) that is higher than a threshold temperature where the hardware of the primary compression device is degraded, the controller may reduce the commanded overall pressure ratio with a factor based on the difference between the predicted temperature and the threshold temperature.

Due to the slower response time of the primary compression device, herein the turbocharger, there may be a temporary boost pressure deficit. For example, the deficit may be due to steady-state boost pressure delivery requiring the turbine to be spun up before it can drive the turbocharger compressor. At 212, the method includes estimating the boost pressure deficit and a corresponding airflow shortfall at the primary compression device. For example, the boost pressure ratio deficit ($\Pi*$) of the turbocharger may be defined as follows:

$$\Pi^* = \frac{\frac{P_2^*}{P_0}}{\frac{P_2}{P_1}} \qquad (3)$$

The controller may calculate the boost pressure deficiency as a function (e.g., ratio or difference) of the actual pressure ratio across the primary compression device relative to the desired or commanded pressure ratio. The actual pressure ratio may be determined as the compressor inlet pressure of the primary compression device relative to the actual throttle inlet pressure. This boost pressure deficiency reflects the airflow shortfall at the primary compression device and is used to allocate a pressure ratio command to the auxiliary compression device.

For example, where the auxiliary compression device is an electric supercharger, the pressure ratio commanded to the electric supercharger is dynamically scheduled based on the capability of the turbocharger (as inferred from the actual pressure ratio of the turbocharger, $P_2/P_1$). This allows the controller to accurately know the exact boost pressure deficit in real-time, as the turbine is spinning up, and regulate an electric supercharger speed command (n_eSC) to reduce the deficit. In addition, the controller can shape the closed-loop system dynamics by knowing the pressure ratio of the electric supercharger ($P_1/P_0$), as described herein.

For example, the desired pressure ratio target of the electric supercharger $$\left(\frac{P_1^*}{P_0}\right)$$

is defined as Π* with a constraint on the pressure ratio of the turbocharger, as shown as:

$$\frac{P_1^*}{P_0} = \frac{\frac{P_2^*}{P_0}}{\max\left\{1, \frac{P_2}{P_1}\right\}} \quad (4)$$

The constraint is included to prevent the desired pressure ratio target for the electric supercharger to exceed the total desired system pressure ratio if $P_1 > P_2$, which could happen briefly after an opening of the throttle.

At 214, the method includes generating a pressure ratio command for the faster auxiliary, compression device. In one example, the pressure ratio command is generated based on the pressure ratio deficit. In another example, the pressure ratio command is generated based on the corresponding airflow shortfall. For example, the controller may estimate an inlet pressure of the electric supercharger (e.g., based on a measured barometric pressure) and use a look-up table, model, or algorithm to calculate a desired outlet pressure of the electric supercharger that meets the airflow shortfall. The pressure ratio command for the electric supercharger may then be determined as ratio of the actual inlet pressure relative to the desired outlet pressure.

At 216, the method includes commanding electric assistance to the auxiliary compression device. In particular, the controller may command positive motor torque from the electric motor to auxiliary compression device, such as the electric supercharger, as a function of the deficit-based pressure ratio command. In one example, commanding the positive motor torque includes estimating a compressor speed of the electric compressor that will provide the desired compressor outlet pressure at the electric supercharger, such as via a look-up table, map, or algorithm, and then estimating a motor speed of the electric motor (or a degree of electric assistance) that will provide the estimated compressor speed. The controller may then adjust a duty cycle commanded to the electric motor to operate the motor at the required motor speed.

Next, at 218, the actual boost pressure may be compared relative to the target throttle inlet pressure to determine if the actual boost pressure is within a threshold of the target throttle inlet pressure (TIP). For example, it may be determined if the outlet pressure of the turbocharger is within a threshold of the desired TIP, such as when a difference between the outlet pressure and the desired TIP is smaller than a threshold. In an alternate example, a ratio of the outlet pressure of the turbocharger may be compared to the target throttle inlet pressure. If the difference (or ratio) is not within the threshold, then at 220, the controller continues to dynamically adjust the allocation of pressure ratios across the primary and auxiliary compression devices. In particular, as the turbine spins up and the boosting capability of the turbocharger increases, the pressure ratio across the turbocharger may start to approach the commanded pressure ratio, the shortfall may start to drop, and accordingly the pressure ratio (and electric assistance) commanded at the electric supercharger may be decreased.

In this way, the controller continually adjusts the auxiliary compression device in real-time based on the actual capability of the primary compression device. The controller may use a dynamic allocated module, as further described herein at FIG. 5, to adjust the pressure ratios. Consequently, as the slower-responding turbocharger spools up, the desired assist from the faster-responding electric supercharger is gradually phased out. Finally, when the turbocharger is able to sustain the total desired boost, no assist is required from the electric supercharger. An example of the dynamic allocation of the pressure ratios and the resulting expedited achievement of the target boost pressure with minimal reliance on electric assistance is described herein with reference to FIG. 3.

Turning briefly to FIG. 3, map 300 depicts pressure ratio across the y-axis and time along the x-axis. The overall commanded pressure ratio which is based on the torque demand, represented by $P^*_2/P_0$, is depicted by dashed line 302. As such, this is the pressure ratio commanded to the primary compression device. The actual pressure ratio of the primary compression device, represented by $P_2/P_1$, is depicted by dashed line 304, and is indicative of the primary compression device's boosting capability. This changes over time and builds to the steady-state value that was commanded gradually due to the primary compression device's slower response time. An interim pressure ratio deficit, represented by π*(unclipped), is depicted by dashed line 306. The clipped version of this pressure ratio deficit is used to schedule the pressure ratio commanded to the auxiliary compression device, which has the faster response time. The pressure ratio commanded to the auxiliary compression device, represented by $P^*_1/P_0$, is depicted by solid line 308.

Responsive to the torque demand, an overall pressure ratio command 302 is determined and commanded to the primary compression device. However, due to the slow response time of the primary compression device (e.g., turbo lag), the actual pressure ratio 304 achieved at the primary compression device is lower, and initially the pressure ratio deficit 306 may be significant. If this pressure ratio deficit is not addressed, the transient boost response is adversely affected. The pressure ratio deficit is met by commanding a pressure ratio 308 to the auxiliary compression device. In particular, during the initial part of the boost response, a larger portion of the overall pressure ratio is dynamically allocated to the auxiliary compression device due to the larger pressure ratio deficit incurred at the primary compression device. Then, as the primary compression device spins up, a larger portion of the overall pressure ratio is delivered by the primary compression device, and the contribution of auxiliary compression device is dynamically reduced by phasing out the pressure ratio commanded to the auxiliary compression device. As a result, the overall reliance on electric assistance is minimized while improving the transient boost response.

Returning to FIG. 2, at 218, if the boost pressure is within the threshold of the target TIP, but still below the target TIP, then at 222, the method includes providing negative motor torque from the electric motor to the auxiliary compression device. This allows the boost pressure to coast to the target TIP, reducing the likelihood of pressure overshoot. In addition, electric assistance from the motor is reduced earlier, improving fuel economy. Furthermore, by operating the motor as a generator in a region where pressure overshoot could occur, energy recuperation via the motor is enabled, further improving fuel economy while also improving the boost response. The controller may use a lead compensator module, as further described herein at FIG. 5, to determine the timing (e.g., in relation to turbine speed or boost pressure) at which electric assistance from the motor is discontinued and when the motor is transitioned to being operated as a generator. In one example, the motor may be spun as a generator at a speed that is based on the predicted overshoot. The routine then ends.

As mentioned earlier, the compound boosting system can be described as:

$$P_2 = P_0 * \frac{P_1}{P_0} * \frac{P_2}{P_1} \quad (5)$$

where $P_0$ is the inlet pressure to the first boosting device and $P_1$, $P_2$ are the outlet pressure from the first and second boosting device (TIP). $P_1^*$, $P_2^*$ denote the desired pressure target for the first and second boosting device. In the configuration described above, the first boosting device is a transient (auxiliary) device, such as the electric supercharger, and the second boosting device is the main device, such as the turbocharger. The control reference of the first boosting device is determined as:

$$\frac{P_1^*}{P_0} = \frac{P_2^*}{P_0} * \min\left\{1, \frac{P_1}{P_2}\right\} \text{ or } P_1^* = P_2^* * \min\left\{1, \frac{P_1}{P_2}\right\} \quad (6)$$

A clip is included to prevent the desired pressure target for the first boosting device to exceed that of the second boosting device if $P_1 > P_2$, which could happen briefly after an opening of the throttle. The main boosting device is required to deliver the entire desired boost pressure. Therefore, the target for the second device $P_2^*$ is always to provide the full pressure ratio (from ambient) regardless of the state of the auxiliary device. In this case:

$$\frac{P_2}{P_1} \to \frac{P_2^*}{P_0} \text{ or } P_2 * \frac{P_0}{P_1} \to P_2^*, \text{ when } \lim_{t \to \infty} \frac{P_1}{P_0} = 1 \quad (7)$$

As such, a base controller can be overwritten to not operate the auxiliary boosting device or operate the auxiliary boosting device in a continuous fashion, and vice versa for the main boosting device.

If the controller is calibrated conservatively to minimize $P_2$ overshoot, boost pressure response may become slower than the maximum system capability. Therefore, by using a lead compensator together with aggressive calibration of the controller, the transient response of the boosting system is improved. In the meantime, the lead compensator will request a speed reduction before $P_2$ approaches $P_2^*$. The command enables the energy recuperation mode of the electric motor, maximizing the window for energy recuperation.

The lead compensator in Laplace domain can be expressed as:

$$\frac{Y(S)}{U(S)} = \frac{\alpha s + 1}{\tau s + 1}$$

Input U is the pressure ratio error of the electric supercharger:

$$U = \frac{P_1^*}{P_0} - \frac{P_1}{P_0}$$

To implement in the discrete system, the following conversion is derived:

$$x_k = (1-f)x_{k-1} + fu_k, f = \frac{T_s}{\tau + T_s}$$

$$y_k = (1-r)x_k + ru_k, r = \frac{\alpha}{\tau} \geq 1$$

where f is the time constant in discrete domain, r is the lead ratio, and $T_s$ is the execution rate.

The output of the lead compensator is clipped for allowing specification of the range of lead actions on U in increasing or decreasing directions.

$$\widetilde{y_k} = \text{clip}(u_k - \Delta_1, y_k, u_k + \Delta_2)$$

An example of the lead compensation of the pressure ratio at the electric supercharger and the resulting reduction in pressure overshoot and expedited enablement of energy recuperation at the electric motor is described herein with reference to FIG. 4.

Turning briefly to FIG. 4, map 400 depicts how lead compensation is used along with dynamic pressure ratio allocation to improve transient boost response while maximizing energy recuperation opportunities. Map 400 includes maps 402 and 404. Map 404 depicts changes in an electric assist commanded to an electric supercharger (across the y-axis) over time (along the x-axis) in relation to the allocation of a pressure ratio (across the y-axis) over the same time frame (along the x-axis) between a turbocharger and an electric supercharger, represented at map 402. The overall commanded pressure ratio which is based on the torque demand, represented by $P_2^*/P_0$, is depicted by solid line 408. As such, this is the pressure ratio commanded to the primary compression device, herein a turbocharger. The actual pressure ratio achieved via the compound boost system, represented by $P_2/P_0$, without lead compensation (w/o LC) is depicted by plot 410, and is to be compared to $P_2/P_0$ achieved with lead compensation (with LC), depicted by plot 412. The motor speed commanded to the electric supercharger without lead compensation (w/o LC) is shown at plot 430 and is to be compared to motor speed command with lead compensation (with LC), depicted by plot 434. The portion of the motor speed command received via the lead compensator module of the controller is shown at plot 432.

Prior to t1, the engine is operating without boost and therefore the commanded pressure ratio is low. At t1, responsive to an increase in operator torque demand, the boost pressure requirement increases. As a result, the overall pressure ratio command (408) that is generated based on the torque demand increases. This is the signal that is commanded to the turbocharger for steady-state achievement of a target TIP. However, due to the slow response time of the turbocharger, there is a temporary pressure ratio deficit that is met by actuating the electric supercharger and dynamically allocating a larger portion of the overall commanded pressure ratio the electric supercharger. In particular, at t1, a pressure ratio command is delivered to the electric supercharger as a function of the boost pressure (for example, based on the corresponding airflow deficit) that results from the slow response of the turbocharger. In accordance, the motor speed of the electric supercharger is increased (430, 434) which results in an increase in the pressure ratio across the supercharger. At this time, the electric motor is operating in a motor mode to provide energy to the supercharger.

As the turbine spins up, it is able to account for a larger portion of the overall pressure ratio command. After t2, when the pressure ratio at the turbocharger is within a threshold of the overall pressure ratio, but still below the overall pressure ratio, the lead compensator module sends a signal (432) to the electric motor to decrease the motor speed and provide negative motor torque. At this time, the electric motor is operating in a generating mode to recuperate energy from the supercharger. As a result of the timing of the lead compensation before the target overall pressure ratio is attained, the pressure ratio at the turbocharger (412) coasts to the target pressure ratio. If the lead compensation were not provided, the pressure ratio at the turbocharger (410) would overshoot the overall pressure ratio (that is, $P_2/P_0$ would exceed $P_2^*/P_0$), resulting in a torque error. This may affect drivability. Also, as a result of the timing of the lead compensation before the target overall pressure ratio is attained, the pressure ratio at the supercharger is decreased in a timely manner. If the lead compensation were not provided, the pressure ratio at the supercharger (420) would also overshoot the commanded pressure ratio (that is, $P_1/P_0$ would exceed $P_1^*/P_0$). Not only would this result in a drop in fuel economy due to the electric supercharger being operated for longer than required, but an additional drop in fuel economy would occur due to the missed energy recuperation opportunity. Instead, by providing the lead compensation earlier, the pressure overshoot is addressed by absorbing torque at the motor. As a result, the overall transient response of the boosted engine is improved while also extending the window of energy recuperation for the electric motor.

It will be appreciated that the electric supercharger may be the transient device that is not controlled continuously. A supervisory controller may coordinate operation of the electric supercharger and the electric supercharger bypass valve. The main objective of the supervisory controller may be to determine when to activate and deactivate the electric supercharger and electric supercharger bypass valve to meet control requirements, subject to system constraints and hardware protection. At a high level, the electric supercharger is activated and the bypass valve closed when the activation criteria is met and no system faults are observed. Once the deactivation criteria are met or system faults are observed, the electric supercharger is deactivated and the bypass valve is opened.

There may be several considerations in the design of the activation strategy. First, the controller may activate the electric supercharger only when necessary, such as when the vehicle drivability is unacceptable because of the slow response of the turbocharger. Second, proactive action may be desired if the strategy does not have to wait until unacceptable drivability is observed. Lastly, the controller aims to reduce unwanted activation for driver change-of-mind events.

Since the boost pressure ratio deficit ($\Pi^*$) can be used as an index to determine the driver demand deficit (that represents the drivability), the proactive action can be achieved by looking at the rate of change of $\Pi^*$, and the threshold ($f_2$) for activation is determined as a function of $\Pi^*$ as follows:

$$\frac{d(\Pi^*)}{dt} > f_2(\Pi^*)$$

Two first order low pass filters ($H_{lp}$) on both the $\Pi^*$ and $$\frac{d(\Pi^*)}{dt}$$

are added to mitigate "false positive" activation during the driver change-of-mind events, such as when the driver aggressively presses the acceleration pedal but rapidly removes the command, as follows:

$$H_{lp\_k_{1,2}} = (1 - h_{1,2})H_{lp\_k_{1,2}-1} + h_{1,2}\Pi_k^* \quad h_{1,2} = \frac{T_s}{\tau_{1,2} + T_s}$$

where $h_{1,2}$ are the two time constants in the discrete domain.

The activation strategy is illustrated via a sample acceleration trajectory at FIG. 7. The trajectories shown at map 700 are constructed with X-axis depicting the filtered boost pressure deficit and the Y-axis depicting the filtered rate of change of the boost pressure deficit. The activation threshold depicted by solid line 702, is determined as a function of the filtered $\Pi^*$. The acceleration trajectory when electric assist from the electric motor is not required is shown by clear circles 706. The acceleration trajectory when electric assist from the electric motor is required is shown by filled circles 704. The calibration shows that the electric supercharger will be activated when the rate of change of the $\Pi^*$ is high, even when the absolute $\Pi^*$ is low. On the other hand, if $\Pi^*$ is gradually developed to reach an unacceptable level, the strategy will activate the electric supercharger. The main criteria to deactivate the electric supercharger is when the turbocharger is able to sustain the desired boost, or the boost pressure deficit is reduced and below a threshold, such as when:

$$\Pi^* \leq \alpha$$

where $\alpha$ is a calibratable constant.

It will be appreciated that while the examples discussed above pertain to a configuration including a turbocharger coupled to an electric supercharger, this is not meant to be limiting. In other examples, the turbocharger may be configured with electric assistance (e.g., as an e-turbo having an electric motor coupled to the compressor, the turbine, or the turbocharger shaft). Further examples may pertain to boosted engines have staged superchargers or stages turbochargers, at least one of which has electric assistance.

Figure 5:
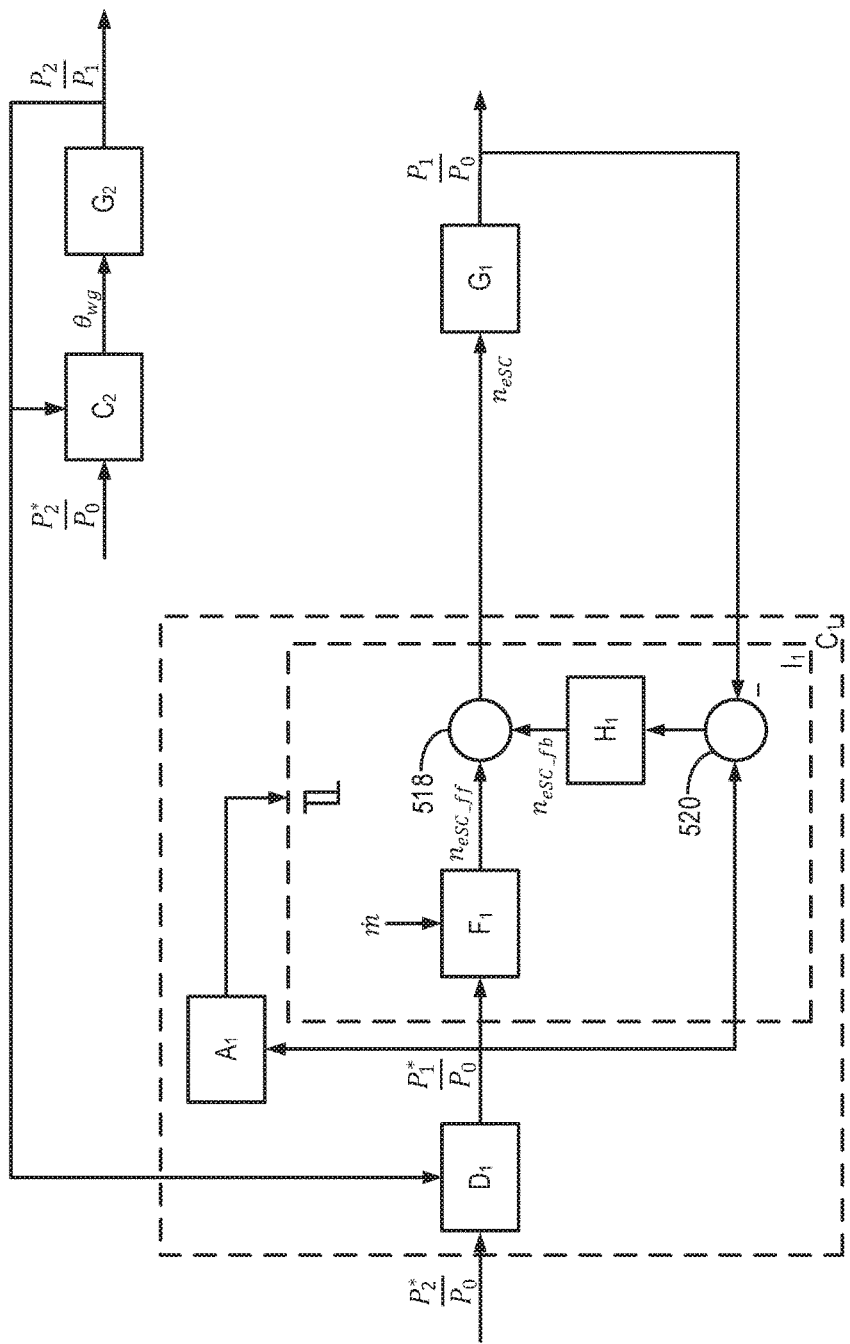
FIG. 5 depicts an example block diagram of a boost control architecture including dynamic pressure ratio allocation and lead compensation abilities.

Turning now to FIG. 5, a block diagram of an example control architecture for a compound boosting system having a higher frequency compression device with electric assistance and a lower frequency compression device is shown. For example, the control architecture may be applied to an engine system having an electric supercharger compressor (e.g., first compressor 110 of FIG. 1) coupled to an engine intake passage upstream of a turbocharger compressor (e.g., second compressor 114 of FIG. 1). The control architecture may be utilized by a controller (e.g., controller 12 of FIG. 1) while performing a control method, such as method 200 of FIG. 2, in order to regulate boost pressure delivery.

The electric supercharger controller ($C_1$) includes a dynamic allocator ($D_1$) that apportions the desired boost pressure control reference; a state machine ($A_1$) that manages the operation of electric supercharger system; a closed-loop controller ($I_1$) that consists of a model based feed forward function ($F_1$), and a feedback controller ($H_1$) for calculating the desired electric supercharger speed command.

The feed forward control action ($n_{eSC\_ff}$) of the electric supercharger is based on the steady state compressor map provided by the supplier. The compressor map is converted to look up desired compressor speed based on the inputs of corrected mass flow ($\dot{m}_{corr}$) and desired pressure ratio $$\left(\frac{P_1^*}{P_0}\right).$$

$$n_{eSC\_ff} = f_1\left(\frac{P_1^*}{P_0}, \dot{m}_{corr}\right) \quad (8)$$

Mass flow ($\dot{m}$) is estimated as the desired cylinder air flow, then corrected to the reference pressure ($P_{ref}$) and temperature ($T_{ref}$).

$$\dot{m}_{corr} = \frac{\dot{m}\sqrt{\frac{T_0}{T_{ref}}} P_0}{P_{ref}} \quad (9)$$

The desired boost pressure reference of the electric supercharger is obtained from the desired throttle inlet pressure ($P_2^*$) that is processed by a high pass filter ($H_1$). The frequencies that pass through the high pass filter are the frequencies that the turbocharger is not able to respond to, in other words, the deficit of the turbocharger capability. A closed-loop control $C_1$ determines the desired speed command ($n_{eSC}$) of the electric supercharger. $C_2$ is the controller for turbocharger that determines the wastegate position ($\theta_{wg}$). Because of the dynamics between waste-gate and the turbocharger speed, there is generally not a need to add a low pass filter to $P_2^*$ for turbocharger control, but one can be added as necessary. Also, $C_2$ is designed such that the waste-gate is saturated during large transients and only tunes the response when throttle inlet pressure is approaching to the desired target. At that time, control actions from $C_1$ are greatly reduced because of the high pass filter that ensures minimum interaction between the two actuators.

A proportional feedback controller ($H_1$) is implemented to account for plant model (the electric supercharger compressor map) mismatch. Steady-state boost tracking is designed to be delivered by the main turbocharger. Therefore, there is no integral action in the feedback controller. A lead compensator is added to shape the closed-loop control response since the inner loop electric supercharger speed controller may have a different bandwidth for controlling the speed in increasing or decreasing directions.

Supervisory controller ($A_1$) is developed to coordinate the electric supercharger and electric supercharger bypass valve. The main objective of the supervisory controller is to determine when to activate and deactivate the electric supercharger and electric supercharger bypass valve to meet control requirements, subject to system constraints and hardware protection. At a high level, the electric supercharger will be activated and the bypass valve closed when the activation criteria is met and no system faults are observed. Once the deactivation criteria is met or system faults are observed, the electric supercharger will be deactivated and the bypass valve opens.

A desired boost pressure ratio across both compressors $$\left(\frac{P_2^*}{P_0}\right)$$

along with a measured (e.g., achieved) pressure ratio across the turbocharger compressor $$\left(\frac{P_2}{P_1}\right)$$

are input into the dynamic allocator $D_1$. The pressure ratio across the turbocharger compressor may be controlled by turbocharger controller $C_2$ which receives the desired boost pressure ratio across both compressors as well as the measured pressure ratio across the turbocharger compressor as feedback. Controller $C_2$ then produces a signal for adjusting a degree of opening of a turbocharger waste-gate actuator ($\theta_{wg}$), which is then sent to the turbocharger $G_2$, resulting in the pressure ratio across the turbocharger compressor $$\frac{P_2}{P_1}.$$

Thus, the opening of the turbocharger waste-gate actuator may be controlled based on the desired boost pressure ratio and the achieved pressure ratio across the turbocharger compressor. For example, as the desired boost pressure ratio increases, the degree of opening of the waste-gate actuator may be decreased in order to flow a greater portion of exhaust gas through a turbine of the turbocharger and not through the turbocharger waste-gate actuator, thereby increasing a speed of the turbine and, as a result, the pressure ratio across the turbocharger compressor.

Dynamic allocator $D_1$ uses the pressure ratio across the turbocharger compressor and the overall desired boost pressure ratio to calculate a desired pressure ratio $$\left(\frac{P_1^*}{P_0}\right)$$

for the supercharger compressor, for example, using the functions described above. The desired pressure ratio for the supercharger as well as measured pressures $P_0$ and $P_2$ and desired boost pressure $P_2^*$ are input into a state machine $A_1$, which is a supervisory controller for a discrete event system. State machine $A_1$ determines whether $P_2$ is deficient enough (e.g., greater than a threshold deficiency) to trigger activation of the electric supercharger. Additionally, there are other criteria that ensure that electric supercharger operation would not violate other engine system constraints, for example, due to faults, temperature, electric power availability, etc. Hysteresis is also added to the activation criteria as:

$$\frac{P_2^*}{P_0} - \frac{P_2}{P_1} \geq \text{hysteresis}$$

to avoid on/off cycling of the system.

Once electric supercharger activation is triggered, the desired supercharger compressor pressure ratio together with a desired mass flow ($\dot{m}$) are input into a model-based feedforward controller $F_1$. For example, model-based feedforward controller $F_1$ may look up a corresponding supercharger compressor speed from a compressor map. The corresponding supercharger compressor speed, $n_{eSC\_ff}$, is then output to an adder element 518.

The desired supercharger compressor pressure ratio is also input into an adder element 520 along with a feedback signal concerning the actual supercharger compressor pressure ratio $$\left(\frac{P_1}{P_0}\right),$$

which is subtracted from the desired supercharger compressor pressure ratio as part of an outer loop control $C_1$. The result is input into an error feedback controller to fine-tune the supercharger compressor speed as well as regulate any inaccuracies of the compressor map. A feedback response concerning the supercharger compressor speed, $n_{eSC\_fb}$, generated by the error feedback controller is then input to the adder element 518, which outputs the electric supercharger compressor speed $n_{eSC}$ for the given operating conditions. The electric supercharger compressor speed may be transformed into a corresponding electric signal (e.g., duty cycle) that is applied to an electric motor of electric supercharger $G_1$ to produce the pressure ratio across the supercharger compressor $$\left(\frac{P_1}{P_0}\right).$$

Thus, the supercharger compressor speed may be continuously updated based on $$\frac{P_2^*}{P_0} \text{ and } \frac{P_2}{P_1}$$

and, more specifically, a deficit between $$\frac{P_2}{P_1} \text{ and } \frac{P_2^*}{P_0}.$$

Figure 6:
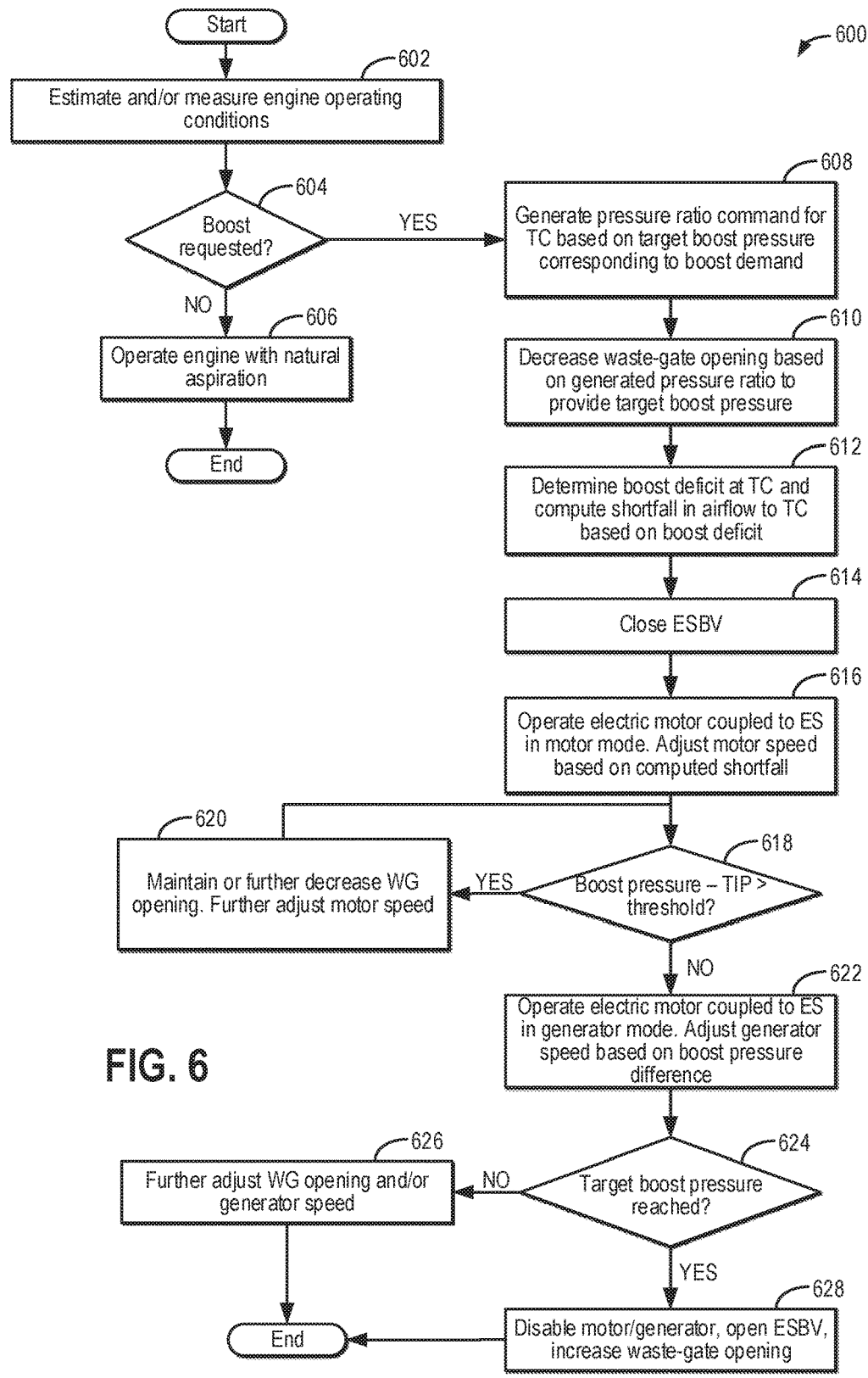
FIG. 6 depicts an example method for boost control by coordinating operation of a turbocharger and an electric supercharger using dynamic pressure ratio allocation and lead compensation.

Turning now to FIG. 6, an example method 600 for operating a boosted engine system having an electric supercharger (e.g., supercharger 13 of FIG. 1) staged upstream of a turbocharger (e.g., turbocharger 15 of FIG. 1), is shown. Herein, the turbocharger is configured as a main boosting device, and the supercharger is configured as an auxiliary boosting device.

At 602, method 200 includes estimating and/or measuring engine operating conditions. For example, operating conditions assessed may include engine speed, pedal position, operator torque demand, manifold absolute pressure, manifold air flow, manifold air temperature, ambient conditions (such as ambient temperature, barometric pressure, and humidity), engine coolant temperature, etc. For example, barometric pressure may be measured by a pressure sensor, such as pressure sensor 58 of FIG. 1.

At 604, method 600 includes determining if boost is requested. In one example, boost may be requested at mid-high engine loads. In another example, boost may be requested in response to an operator pedal tip-in or an increase in driver torque demand. If boost is not requested, such as when the engine load is low or the driver torque demand is low, method 600 proceeds to 606 and includes operating the engine with natural aspiration (e.g., manifold vacuum). Operating the engine with natural aspiration may include not activating the staged boosting devices. For example, an electric motor for driving the electric supercharger (e.g., electric motor 108) may not be powered, and the turbocharger wastegate actuator may be commanded fully open in order to direct a portion of exhaust through the wastegate while bypassing a turbine of the turbocharger (e.g., turbine 116 of FIG. 1). Following 606, method 600 ends.

If boost is requested at 604, such as responsive to a tip-in event, method 600 proceeds to 608 and includes generating a desired pressure ratio (e.g., a target pressure ratio) command for the turbocharger based on the boost demand. The desired pressure ratio, defined as $$\frac{P_2^*}{P_0},$$

is a ratio of a desired outlet pressure of a compressor of the turbocharger (e.g., second compressor 114 of FIG. 1), which is also equal to the desired boost pressure (or desired TIP), relative to $P_0$ which represents an inlet pressure of a compressor of the electric supercharger (e.g., first compressor 110 of FIG. 1). For example, $P_0$ may be equal to barometric pressure (e.g., as measured by pressure sensor 58 of FIG. 1).

At 610, the method includes decreasing an opening of the turbocharger waste-gate based on the overall pressure ratio command. For example, as the pressure ratio command increases, the waste-gate opening may be decreased. In one example, the waste-gate is fully closed. By closing the turbocharger waste-gate, all of the exhaust flow may be directed through the turbocharger turbine, expediting spin-up of the turbine. Optionally, a compressor recirculation valve (such as CRV 62 of FIG. 1) may also be closed so that pressure loss across the turbocharger compressor is reduced. Thereafter compressed air is flowed to the engine via the turbocharger compressor. At this time, the electric supercharger bypass valve is open, causing the air to flow to the turbocharger compressor while bypassing the supercharger.

At 612, the method includes calculating a boost pressure deficiency at the turbocharger. The boost pressure deficiency may be determined by a boost pressure shortfall ($P_2^*-P_2$), which is a difference between the desired boost pressure and the measured throttle inlet pressure, as well as a rate of change of the boost pressure shortfall $$\left(\frac{d(P_2^* - P_2)}{dt}\right).$$

For example, the turbocharger may be unable to achieve the desired boost pressure due to turbo lag, as described with respect to FIG. 2. The controller may also determine an air flow shortfall at the turbocharger (inlet) corresponding to the boost pressure deficiency or use pressure ratios rather than delta pressures. In alternate examples, the boost pressure deficiency is based on a ratio of the desired boost pressure and the measured throttle inlet pressure instead of the difference. In other words, the boost pressure deficiency is based on the desired boost pressure relative to the measured throttle inlet pressure.

At 614, responsive to the indication of a boost pressure deficit being present, the method includes closing the ESBV.

By (fully) closing the ESBV, the electric supercharger compressor may be included in the intake flow path and intake air is flowed to the turbocharger compressor via the electric supercharger. That is, airflow through the supercharger compressor is increased. In other examples, the ESBV may be closed responsive to the amount of the boost pressure deficiency, such as responsive to the amount being greater than a threshold, such as a threshold above which transient boost response is adversely affected. For example, it may be determined if an absolute amount of the boost pressure deficiency is greater than the threshold, or if a rate of change of the boost pressure shortfall, $$\frac{d(P_2^* - P_2)}{dt},$$

is greater than the threshold, with the threshold calibrated as a function of the boost pressure shortfall:

$$\frac{d(P_2^* - P_2)}{dt} > f_2(P_2^* - P_2)$$

with $f_2$ representing a function. For example, the threshold may decrease as the boost pressure shortfall increases. The threshold may define an allowable amount of boost pressure deficiency above which engine peak power and torque performance may be degraded. Further, the threshold may be set such that, above the threshold, an amount of additional power and torque provided by operating the electric supercharger outweighs an amount of electricity consumed by the electric supercharger. Additionally, both the boost pressure shortfall and the rate of change of the boost pressure shortfall may be run through a first order low pass filter. By filtering the boost pressure shortfall and/or the rate of change of the boost pressure shortfall, unnecessary activation of the supercharger compressor may be reduced, such as due to driver change of mind (e.g., applying an accelerator pedal for less than a threshold duration). If the boost pressure deficiency is not greater than the threshold, the ESBV may be maintained open, the electric supercharger may remain deactivated, and compressed air may flow to the engine via only the turbocharger compressor while bypassing the supercharger compressor.

At 616, responsive to the boost pressure deficiency, the method includes operating the electric supercharger compressor using electric assist to improve transient boost response. Actuating the electric motor coupled to the supercharger compressor serves to accelerate the supercharger compressor, thereby increasing the boost pressure provided to the engine. For example, accelerating the supercharger compressor may include spinning the supercharger compressor via the electric motor using power drawn from a battery (e.g., system battery 45 of FIG. 1). Therefore, the supercharger may be able to provide boost for a limited duration, the duration limited by the state of charge of the system battery powering the electric motor. An amount of power (or duty cycle of power) commanded to the electric motor may be based on a pressure ratio allocated to the supercharger as a function of the deficit. For example, the controller may determine a desired supercharger pressure ratio based on the airflow shortfall. The controller may further input the computed supercharger pressure ratio and MAF into a look-up table to determine the desired supercharger compressor speed. The controller may then input the supercharger compressor speed into an additional look-up table or function to output the motor speed, and a corresponding amount of power (or duty cycle of power) to provide to the electric motor, to produce the target pressure ratio across the supercharger.

The desired supercharger pressure ratio, $$\frac{P_1^*}{P_0},$$

may be clipped to prevent the desired pressure target of the supercharger ($P_1^*$) from exceeding that desired of the turbocharger if $P_1$ is greater than $P_2$, which may occur briefly after an opening of the throttle. Thus, a control reference for the supercharger compressor may be described as:

$$\frac{P_1^*}{P_0} = \frac{P_2^*}{P_0} \times \min\left\{1, \frac{P_1}{P_2}\right\} \text{ or } P_1^* = P_2^* \times \min\left\{1, \frac{P_1}{P_2}\right\}$$

which is also equal to the pressure ratio deficit (or pressure deficit, if $P_1^*$ is determined instead of $$\frac{P_1^*}{P_0})$$

of the turbocharger compressor. That is, the supercharger compressor may be controlled based on the turbocharger boost pressure ratio deficit (or boost pressure deficit) in order to provide the desired boost pressure ratio $$\frac{P_2^*}{P_0}$$

(or boost pressure $P_2^*$). Thereafter compressed air flows to the engine via the turbocharger compressor and the supercharger compressor. As such, the outlet pressure of the turbocharger compressor, $P_2$, contains pressure generated by both the supercharger compressor and the turbocharger compressor.

At 618, the method includes determining if the actual boost pressure achieved at the outlet of the turbocharger is within a threshold of the target boost pressure or TIP. The threshold may be determined as a function of the target TIP or the overall commanded pressure ratio and may be adjusted to reduce the possibility of pressure overshoot. For example, at higher pressure ratios, the threshold may be larger.

If the actual boost pressure is lower than the desired TIP by more than the threshold amount, then at 622, the method includes continuing to provide electric assistance via the supercharger while providing the steady-state boost pressure via the turbocharger. For example, the controller may maintain or further decrease (if possible) the opening of the waste-gate. In addition, the controller may maintain or further increase (if possible) the motor speed of the electric motor.

When the actual boost pressure is lower than the desired TIP by only the threshold amount, the controller may apply the lead compensation and discontinue electric assistance. In particular, the motor speed of the electric motor may be decreased so as to coast the boost pressure to the target TIP with reduced overshoot. In addition, the controller may transition the motor to a generator mode and operate the generator to apply a negative torque on the supercharger compressor, thereby decelerating the supercharger compressor and recuperating the energy which would have otherwise caused the boost pressure overshoot.

At 624, it may be confirmed that the target boost pressure has been reached. If the target boost pressure is not reached, at 626, the method includes further adjusting the waste-gate opening and/or the generator speed. For example, the actuators may be adjusted to provide a target speed profile or trajectory to the target boost pressure. Else, if the target boost pressure has been reached, at 628, the method includes disabling the motor/generator. Therein, the electric motor coupled to the supercharger compressor may be disabled through a signal sent from the controller to an electromechanical actuator of the motor that reduces motor rotation speed. Additionally, the ESBV may be actuated open (e.g., fully open) to allow intake air to flow to engine, via the turbocharger compressor while bypassing the supercharger compressor. Thereafter, compressed air may be supplied to the engine by the turbocharger compressor only and not via the supercharger compressor.

In this way, by transiently and dynamically operating the supercharger compressor based on the turbocharger compressor pressure ratio, boost pressure deficiencies (e.g., due to delays in spinning up the turbocharger turbine) are reduced. Further, an amount of time the supercharger is activated and drawing power is minimized, reducing electric power consumption and increasing fuel economy. Following 628, the method ends.

FIG. 8 depicts a prophetic example graph 800 of dynamic allocation of pressure ratios to provide coordinated turbocharger and electric supercharger control during vehicle operation, such as according to the method of FIG. 2 (and FIG. 6) and using the control architecture of FIG. 5. Accelerator pedal position is shown in plot 802, actual throttle inlet pressure (TIP) is shown at solid line plot 806 relative to the desired TIP at dashed line plot 805, an achieved pressure ratio across a turbocharger compressor $$\left(\frac{P_2}{P_1}\right)$$

is shown in plot 808 relative to a desired overall boost pressure ratio $$\left(\frac{P*_2}{P_0}\right)$$

shown in plot 804, a turbine speed of the turbocharger is shown in plot 810, an achieved pressure ratio across the electric supercharger compressor $$\left(\frac{P_1}{P_0}\right)$$

is shown in plot 812, a commanded electric supercharger motor speed is shown in plot 816 while plot 817 shows generator activation, a degree of opening of an electric supercharger bypass valve (ESBV) is shown in plot 818, and a degree of opening of a turbocharger waste-gate is shown in plot 820. For all of the above, the X-axis represents time, with time increasing along the X-axis from left to right. The Y-axis represents the labeled parameter, with values increasing from bottom to top. In the present example, the electric supercharger compressor is located upstream of the turbocharger compressor, such as in the engine system of FIG. 1.

Prior to time t1, the engine is operated without boost (plot 806) due to a lower driver demand (plot 802) requiring a lower TIP (plot 805). Thus, the actual turbocharger compressor (TC) pressure ratio (plot 808) and the electric supercharger compressor ratio (plot 812) are at a baseline amount (e.g., approximately 1), indicating that the pressure upstream of each compressor is equal to the pressure downstream of each compressor due to air not being compressed by either compressor. Because the electric supercharger (ES) is not activated, the commanded speed of the electric supercharger compressor remains at zero (plot 816) and the ESBV is fully open (plot 818). Thereby, intake air bypasses the electric supercharger compressor instead of being directed to the electric supercharger compressor, as described further with respect to FIG. 1. Further, the turbocharger waste-gate is fully open (plot 820), keeping the turbocharger turbine speed low (plot 810) due to exhaust bypassing the turbine through the open waste-gate.

At time t1, the operator tips in, as shown by the increase in accelerator pedal position (plot 802), moving the engine from operation with natural aspiration to operation with boost. A desired amount of boost pressure, as reflected by a rise in desired TIP (plot 805) is determined based on the amount of driver-demanded torque, and the overall pressure ratio desired across the boosted engine system (plot 804) increases accordingly. The turbocharger is controlled via a command based on the overall desired boost pressure ratio. To provide the desired overall boost pressure ratio in steady-state, the turbocharger waste-gate is fully closed (plot 820), thereby directing all of the exhaust through the turbocharger turbine (and not through the turbocharger waste-gate) in order to spin up the turbine. As a result, the turbine speed (plot 810) begins to increase. However, due to the slow response time of the turbine speed, the turbocharger is unable to achieve the desired overall pressure ratio (see difference between plots 804 and 808) and the desired TIP. The actual turbocharger compressor pressure ratio (plot 808) is below the desired overall boost pressure ratio (plot 804) between time t1 and time t2.

A pressure ratio deficiency and a corresponding air flow deficiency at the turbocharger is determined based on desired overall pressure ratio (804) relative the actual boost pressure ratio at the turbocharger (808) (e.g., based on the difference as in this example or based on a ratio). A pressure ratio corresponding to the air flow deficiency is then commanded to the supercharger compressor (plot 812) so that the combination of the pressure ratio across the supercharger compressor (plot 812) and the pressure ratio across the turbocharger compressor (plot 808), together, can meet the overall desired boost pressure ratio (plot 804). Thus, between t1 and t2, when the turbine speed is lower, a larger portion of the overall boost pressure ratio is allocated to the supercharger since a smaller portion is delivered by the turbocharger.

Responsive to the boost pressure deficiency being greater than the threshold, the electric supercharger is activated shortly after time t1 to fill the deficiency while the turbine spins up. Activating the electric supercharger includes closing the ESBV (plot 818) to direct intake air to the electric supercharger compressor and supplying power to an electric motor driving the compressor at a duty cycle that operates the electric motor at a speed (plot 816) that is based on the boost pressure deficit of the turbocharger compressor. In particular, the commanded speed of the electric motor coupled to the supercharger compressor is selected so that the desired pressure ratio across the supercharger compressor can be provided. The desired electric supercharger compressor pressure ratio increases as the boost pressure deficit at the turbocharger compressor increases. Between time t1 and time t2, a larger portion of the total boost pressure ratio (plot 806) is provided by the boost pressure generated by the electric supercharger, with the electric supercharger pressure ratio rapidly increasing (plot 812) as the electric motor is activated. A smaller portion of the total boost pressure ratio is provided by the turbocharger pressure ratio (plot 808) due to the lower turbocharger turbine speed (plot 810).

Between time t1 and time t2, the turbine spins up slowly (plot 810). However, the pressure ratio across the turbocharger compressor (plot 808) continues to lag behind the total achieved boost pressure ratio (plot 806). Between time t2 and time t3, the turbine speed (plot 810) increases faster, with a corresponding increase in the pressure ratio across the turbocharger compressor (plot 808) and a corresponding decrease in the boost pressure deficiency. As the pressure ratio across the turbocharger compressor (plot 808) increases, the pressure ratio across the supercharger compressor decreases so that the achieved total boost pressure ratio (plot 806) equals the desired boost pressure ratio. Then, once the achieved total boost pressure ratio (plot 806) is close to the desired boost pressure ratio (804), the pressure ratio across the supercharger compressor is gradually decreased (via adjustments to a duty cycle of the electric motor) as the pressure ratio across the turbocharger compressor increases. Between t2 and t3, an increasing portion of the total boost pressure ratio (plot 806) is provided by the boost pressure generated by turbocharger and a remaining portion is provided by the boost pressure generated by the electric supercharger.

At time t3, actual TIP (plot 806) is within a threshold of the desired TIP (plot 805) due to the boost pressure generated by both the turbocharger compressor and the electric supercharger compressor. To reduce a boost pressure overshoot, between t3 and t4, the controller applies lead compensation to reduce the electric motor speed before $P_2$ approaches $P_2^*$. In particular, before actual TIP reaches the target TIP, the electric motor brakes the compressor so as to reduce the supercharger compressor speed and ES pressure ratio. The generator command (plot 817) implies that the motor is operated in a generator mode, which enables energy recuperation at the electric motor/generator coupled to the supercharger compressor. The turbocharger waste-gate may start to open between time t3 and time t4 (plot 820). If this lead compensation were not provided, TIP would have overshot the desired value, causing torque errors, and an energy recuperation opportunity would have been lost.

At time t4, the turbocharger compressor pressure ratio (plot 808) reaches the desired total pressure ratio (plot 804). Therefore, the desired pressure ratio across the supercharger compressor (plot 812) is reduced to a baseline amount (e.g., approximately 1) and the electric supercharger is deactivated (e.g., no power is supplied to the electric motor driving the supercharger compressor). The ESBV is opened (plot 818) to direct intake air directly to the turbocharger compressor and not to the supercharger compressor, and the commanded electric supercharger speed (plot 816) is reduced to zero. As the supercharger compressor spins down, the pressure ratio across the supercharger compressor (plot 812) returns to baseline. Further, the degree of opening of the turbocharger wastegate actuator is increased (plot 820) in response to the turbocharger compressor boost pressure ratio (plot 808) reaching the desired boost pressure ratio (plot 804). Thus, the turbine speed (plot 810) is maintained to provide the desired boost pressure target with feedback concerning the achieved turbocharger compressor boost pressure ratio (plot 808).

At time t5, the accelerator pedal position decreases (plot 802). As a result, the desired total boost pressure ratio decreases accordingly (plot 804). To reduce boost pressure, the turbocharger wastegate actuator (plot 820) is further opened to decelerate the turbocharger turbine (plot 810) and thereby the turbocharger compressor. As a result, the achieved pressure ratio across the turbocharger compressor (plot 808) decreases. Further, because the electric supercharger is disabled, the turbocharger compressor is supplying all of the boost pressure.

At time t6, the accelerator pedal position further decreases (plot 802), for example, due to a tip-out event. The desired total boost pressure ratio (plot 804) decreases down to baseline, as boost is no longer requested based on the driver demand. The turbocharger waste-gate is fully opened (plot 820) to reduce the boost pressure, thereby further decelerating the turbocharger turbine (plot 810) down to a baseline speed. The speed of the turbocharger compressor decreases accordingly, decreasing the amount of boost pressure produced by the turbocharger compressor. As a result, the pressure ratio across the turbocharger compressor (plot 808) decreases to the baseline (e.g., approximately 1). As described above, because the turbocharger compressor is supplying all of the boost pressure, the total boost pressure ratio (plot 806) also decreases to the baseline.

In this way, a turbocharger compressor, coupled downstream of a supercharger compressor, may be operated via a waste-gate adjustment to provide an overall pressure ratio between an inlet of the supercharger compressor and an outlet of the turbocharger compressor based on operator torque demand while operation of the supercharger compressor is dynamically adjusted, via adjustment of an electric motor, based on a real-time pressure ratio (or airflow) shortfall at the turbocharger compressor. Herein, operating the turbocharger compressor via the waste-gate adjustment may include, as the operator boost demand increases, decreasing an opening of the waste-gate to spin up an exhaust turbine of the turbocharger and increase the overall pressure ratio. In a further example, the real-time pressure (or airflow) shortfall at the turbocharger compressor may be estimated based on an actual pressure ratio across the turbocharger compressor relative to the desired overall pressure ratio, the actual pressure ratio across the turbocharger compressor changing as the exhaust turbine spins up. An engine controller may adjust operation of the supercharger compressor by increasing a positive motor torque provided from the electric motor to the supercharger compressor to increase a supercharger compressor speed as the airflow shortfall increases, while maintaining an actual pressure ratio across the supercharger compressor below a threshold pressure ratio based on the desired overall pressure ratio, and further based on the actual pressure ratio across the turbocharger compressor. Further, responsive to a difference (or ratio) between actual throttle inlet pressure and a target throttle inlet pressure based on the operator boost demand being higher than a threshold, the controller may increase a negative motor torque provided from the electric motor to the supercharger compressor to decrease the supercharger compressor speed. In another example, responsive to a boost pressure overshoot, the speed of the supercharger compressor may be reduced by providing negative motor torque from the electric motor while maintaining the decreased opening of the waste-gate. In comparison, responsive to a boost pressure undershoot, the speed of the supercharger compressor may be increased by providing additional positive motor torque from the electric motor while further decreasing the opening of the waste-gate. Adjusting operation of the supercharger compressor based on the airflow shortfall may include, as an example, adjusting an output of the supercharger compressor independent of a position of the waste-gate and independent of a turbine speed of the turbocharger.

In this way, while providing boost with a turbocharger of a compound boosting system, an electric supercharger may be activated in response to a boost pressure deficiency in order to achieve a desired boost pressure, with both the turbocharger and the electric supercharger controlled based on pressure ratio measurements. The technical effect of dynamically adjusting the pressure ratio allocation to the electric supercharger based on the boosting capability of the turbocharger, in real-time, is that transient boost response can be improved. In particular, the electric supercharger may be activated only as long as required to support the turbocharger, minimizing electric assistance drawn from the supercharger. By conserving electric power usage, fuel economy is improved. By calibrating the pressure ratio commanded to the electric supercharger and the turbocharger more aggressively, boost demand can be met more expediently. By providing a positive motor torque to the electric supercharger when the boosting capability of the turbocharger is the actual boost pressure is lower, turbo lag can be addressed. The technical effect of transitioning to providing a negative motor torque when the boost pressure is within a threshold distance of the target pressure, is that the boost pressure may be coasted to the target pressure without incurring any pressure overshoot. In addition, the energy recuperation ability of the electric motor is improved. Overall, boost pressure can be provided rapidly and more efficiently.

An example method comprises: commanding an overall pressure ratio for a first compression device of an engine intake based on operator torque demand; and adjusting a timing of electric engagement provided to a second compression device of the engine intake based on an airflow shortfall at the first compression device. In the preceding example, additionally or optionally, the method further comprises adjusting an amount of the electric engagement provided to the second compression device of the engine intake based on the airflow shortfall at the first compression device. In any or all of the preceding examples, additionally or optionally, the timing and amount of the electric engagement is adjusted to dynamically vary a pressure ratio across the second compression device. In any or all of the preceding examples, additionally or optionally, the adjusting includes, operating the electric motor in a motor mode to provide positive motor torque to the second compression device while the airflow shortfall at the first compression device is higher than a threshold, and operating the electric motor in a generator mode to provide negative motor torque to the second compression device while the airflow shortfall at the first compression device is smaller than the threshold. In any or all of the preceding examples, additionally or optionally, providing positive motor torque to the second compression device includes accelerating the second compression device and increasing the pressure ratio across the second compression device, and wherein providing negative motor torque to the second compression device includes decelerating the second compression device and decreasing the pressure ratio across the second compression device. In any or all of the preceding examples, additionally or optionally, the threshold is based on the overall pressure ratio commanded to the first compression device, and wherein during the electric engagement, a throttle inlet pressure is below a target boost pressure based on the operator torque demand. In any or all of the preceding examples, additionally or optionally, the adjusting further includes, responsive to the throttle inlet pressure being at the target boost pressure, disabling the electric engagement. In any or all of the preceding examples, additionally or optionally, the first compression device is a turbocharger, the second compression device is an electric supercharger, and wherein the first compression device is staged downstream of the second compression device in the engine intake. In any or all of the preceding examples, additionally or optionally, commanding an overall pressure ratio for the first compression device includes adjusting an opening of an exhaust waste-gate valve coupled across an exhaust turbine of the turbocharger. In any or all of the preceding examples, additionally or optionally, the airflow shortfall is estimated in real-time based on an actual pressure ratio across the first compression device relative to the commanded overall pressure ratio, the actual pressure ratio across the turbocharger compressor changing as the exhaust turbine spins up.

Another example method comprises: adjusting operation of a first intake compression device based on a target boost pressure; commanding positive torque from an electric motor to a second intake compression device while a difference between an outlet pressure of the first compression device and the target boost pressure is higher than a threshold; and commanding negative torque from the electric motor to the second intake compression device while the difference is smaller than the threshold. In the preceding example, additionally or optionally, the first intake compression device is a turbocharger having a slower response time than the second intake compressor device, and wherein the adjusting includes commanding an overall pressure ratio for the first intake compression device based on the target boost pressure, and adjusting an opening of a waste-gate valve coupled across an exhaust turbine of the turbocharger based on the commanded overall pressure ratio. In any or all of the preceding examples, additionally or optionally, while commanding both the positive torque and the negative torque, the outlet pressure of the first compression device is below the target boost pressure. In any or all of the preceding examples, additionally or optionally, the method further comprises, in response to the outlet pressure of the first compression device being at the target boost pressure, disabling the electric motor. In any or all of the preceding examples, additionally or optionally, the second compression device is an electric supercharger and wherein the commanding includes dynamically varying a pressure ratio across the second compression device via the negative torque or the positive torque while maintaining the pressure ratio across the second compression device less than a desired pressure ratio across the first compression device. In any or all of the preceding examples, additionally or optionally, commanding the positive torque includes estimating an airflow shortfall at the first compression device, in real-time, based on the difference between the outlet pressure of the first compression device and the target boost pressure; and increasing a compressor speed of the second compression device via the positive torque as the estimated airflow shortfall increases.

Another example vehicle system comprises: an engine having an intake; an accelerator pedal for receiving an operator torque demand; a compound boost system including a first supercharger compressor driven by an electric motor receiving electrical power from a battery, and a second turbocharger compressor driven by an exhaust turbine, the second compressor positioned downstream of the first compressor in the engine intake; a bypass, including a bypass valve, coupled across the first compressor; a waste-gate, including a waste-gate actuator, coupled across the exhaust turbine; and a controller with computer readable instructions stored on non-transitory memory for: commanding an overall pressure ratio for the second compressor based on the operator torque demand; when an actual pressure ratio of the second compressor is further from the overall pressure ratio, providing positive motor torque to increase a pressure ratio of the first compressor; and when the actual pressure ratio of the second compressor is closer to the overall pressure ratio, providing negative motor torque to decrease the pressure ratio of the first compressor. In the preceding example, additionally or optionally, commanding the overall pressure ratio includes decreasing the opening of the waste-gate actuator as the operator torque demand increases to increase the actual pressure ratio across the second compressor, wherein providing the positive motor torque includes operating the electric motor in a motoring mode with a motor output based on an airflow shortfall, the airflow shortfall estimated based on a difference between the actual pressure ratio of the second compressor and the overall pressure ratio, and wherein providing the negative torque includes operating the electric motor in a generating mode with a generator output based on the difference. In any or all of the preceding examples, additionally or optionally, the controller includes further instructions for: closing the ESBV while providing the positive and the negative motor torque. In any or all of the preceding examples, additionally or optionally, the system further comprises a first pressure sensor coupled to the intake, upstream of the first compressor, to estimate barometric pressure; a second pressure sensor coupled to the intake, downstream of the first compressor and upstream of the second compressor, for estimating turbocharger inlet pressure; a third pressure sensor coupled to the intake, downstream of the second compressor for estimating a throttle inlet pressure; and wherein the controller includes further instructions for: estimating the overall pressure ratio based on an output of the third pressure sensor relative to the output of the first pressure sensor; estimating the actual pressure ratio across the second compressor based on an output of the third pressure sensor relative to the output of the second pressure sensor; and estimating the actual pressure ratio across the first compressor based on an output of the second pressure sensor relative to the output of the first pressure sensor.

In a further representation, the controller may include further instructions for estimating the actual pressure ratio across the first compressor based on an output of the second pressure sensor relative to the output of the first pressure sensor; estimating the actual pressure ratio across the second compressor based on the output of the third pressure sensor relative to the output of the second pressure sensor; and estimating the overall pressure ratio of the engine intake based on the output of the third pressure sensor relative to the output of the first pressure sensor.

In another further representation, a method for a boosted engine system includes directing an overall pressure ratio command to a turbocharger; and dynamically adjusting allocation of a portion of the overall pressure ratio command to the supercharger based on an airflow shortfall at the turbocharger compressor, the airflow shortfall based on turbine speed. In the preceding example, additionally or optionally, the directing an overall pressure ratio command to the turbocharger includes a waste-gate adjustment. In any or all of the preceding examples, additionally or optionally, the airflow shortfall is estimated based on an actual pressure ratio at the turbocharger relative to the overall pressure ratio command, the actual pressure ratio inferred from the turbine speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
operating a first compression device of an engine intake based on operator torque demand; and while operating the first compression device:
  operating an electric motor in a motor mode to provide positive motor torque to a second compression device of the engine intake while an airflow shortfall at the first compression device is higher than a threshold;
  operating the electric motor in a generator mode to provide negative motor torque to the second compression device while the airflow shortfall at the first compression device is smaller than the threshold; and
  disconnecting the second compression device, bypassing the second compression device by opening a bypass valve of the second compression device, and providing compressed air via only the first compression device when there is substantially no airflow shortfall at the first compression device.

2. The method of claim 1, wherein providing positive motor torque to the second compression device includes accelerating the second compression device and increasing a pressure ratio across the second compression device, and wherein providing negative motor torque to the second compression device includes decelerating the second compression device and decreasing the pressure ratio across the second compression device.

3. The method of claim 1, wherein the threshold is based on an overall pressure ratio commanded to the first compression device, and wherein the airflow shortfall occurs when a throttle inlet pressure is less than a target boost pressure, where the target boost pressure is determined based on the operator torque demand.

4. The method of claim 3, wherein the first compression device is a turbocharger, the second compression device is an electric supercharger, and wherein the first compression device is staged downstream of the second compression device in the engine intake.

5. The method of claim 4, wherein commanding the overall pressure ratio for the first compression device includes adjusting an opening of an exhaust waste-gate valve coupled across an exhaust turbine of the turbocharger.

6. The method of claim 5, wherein the airflow shortfall is estimated in real-time based on an actual pressure ratio across the first compression device relative to the commanded overall pressure ratio, the actual pressure ratio across the turbocharger changing as the exhaust turbine spins up.

7. A method, comprising:
  adjusting operation of a first intake compression device based on a target boost pressure; and
  while adjusting operation of the first intake compression device:
  commanding positive torque from an electric motor to a second intake compression device while a difference between an outlet pressure of the first intake compression device and the target boost pressure is higher than a threshold;
  commanding negative torque from the electric motor to the second intake compression device while the difference is smaller than the threshold; and
  disabling the electric motor and bypassing the second intake compression device when the outlet pressure of the first intake compression device reaches the target boost pressure.

8. The method of claim 7, wherein the first intake compression device is a turbocharger having a slower response time than the second intake compression device, and wherein the adjusting operation of the first intake compression device includes: commanding an overall pressure ratio for the first intake compression device based on the target boost pressure, and adjusting an opening of a waste-gate valve coupled across an exhaust turbine of the turbocharger based on the commanded overall pressure ratio.

9. The method of claim 8, wherein while commanding both the positive torque and the negative torque, the outlet pressure of the first intake compression device is below the target boost pressure.

10. The method of claim 8, wherein the second intake compression device is an electric supercharger and wherein the commanding positive torque and the commanding negative torque include dynamically varying a pressure ratio across the second intake compression device while maintaining the pressure ratio across the second intake compression device less than a desired pressure ratio across the first intake compression device.

11. The method of claim 8, wherein commanding the positive torque includes:
  estimating an airflow shortfall at the first intake compression device, in real-time, based on the difference between the outlet pressure of the first intake compression device and the target boost pressure; and
  increasing a compressor speed of the second intake compression device via the positive torque as the estimated airflow shortfall increases.

12. A vehicle system, comprising:
  an engine having an intake;
  an accelerator pedal for receiving an operator torque demand;
  a compound boost system including a first turbocharger compressor driven by an exhaust turbine, the first turbocharger compressor positioned downstream of a second supercharger compressor in the engine intake, the second supercharger compressor driven by an electric motor receiving electrical power from a battery;
  a bypass, including a bypass valve, coupled across the second supercharger compressor;
  a waste-gate, including a waste-gate actuator, coupled across the exhaust turbine; and
  a controller with computer readable instructions stored on non-transitory memory for:
    commanding an overall pressure ratio for the first turbocharger compressor based on the operator torque demand;
    adjusting a timing of an electric engagement provided to the second supercharger compressor, the adjusting the timing including when an actual pressure ratio of the first turbocharger compressor is further from the overall pressure ratio, providing positive motor torque to increase a pressure ratio of the second supercharger compressor; and
    when the actual pressure ratio of the first turbocharger compressor is closer to, but not yet at, the overall pressure ratio, providing negative motor torque to decrease the pressure ratio of the second supercharger compressor; and
    when the actual pressure ratio of the first turbocharger compressor reaches the overall pressure ratio, disabling the second supercharger compressor and opening the bypass valve to bypass the second supercharger compressor while still providing compressed air via the first turbocharger compressor based on operator torque demand.

13. The system of claim 12, wherein commanding the overall pressure ratio includes decreasing an opening of the waste-gate actuator as the operator torque demand increases to increase the actual pressure ratio across the first turbocharger compressor, wherein providing the positive motor torque includes operating the electric motor in a motoring mode with a motor output based on an airflow shortfall, the airflow shortfall estimated based on a difference between the actual pressure ratio of the first turbocharger compressor and the overall pressure ratio, and wherein providing the negative torque includes operating the electric motor in a generating mode with a generator output based on the difference.

14. The system of claim 13, wherein the controller includes further instructions for:
closing the bypass valve while providing the positive and the negative motor torque.

15. The system of claim 13, further comprising:
a first pressure sensor coupled to the intake, upstream of the second supercharger compressor, to estimate barometric pressure;
a second pressure sensor coupled to the intake, upstream of the first turbocharger compressor and downstream of the second supercharger compressor, for estimating turbocharger inlet pressure;
a third pressure sensor coupled to the intake, downstream of the first turbocharger compressor for estimating a throttle inlet pressure; and
wherein the controller includes further instructions for:
estimating the overall pressure ratio based on an output of the third pressure sensor relative to an output of the first pressure sensor;
estimating the actual pressure ratio across the first turbocharger compressor based on the output of the third pressure sensor relative to an output of the second pressure sensor; and
estimating the actual pressure ratio across the second supercharger compressor based on the output of the second pressure sensor relative to the output of the first pressure sensor.

* * * * *